(12) United States Patent
Inaba et al.

(10) Patent No.: US 7,026,774 B2
(45) Date of Patent: Apr. 11, 2006

(54) ROTOR POSITION DETERMINATION DEVICE OF ROTATING ELECTRIC MACHINE AND CONTROL DEVICE OF ROTATING ELECTRIC MACHINE

(75) Inventors: Yutaka Inaba, Numazu (JP);
Masakatsu Takahashi, Numazu (JP);
Tomohiro Nakagawa, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/188,674

(22) Filed: Jul. 25, 2005

(65) Prior Publication Data

US 2006/0022623 A1  Feb. 2, 2006

(30) Foreign Application Priority Data

Aug. 2, 2004  (JP) ............................. 2004-225734

(51) Int. Cl.
*H02P 5/28* (2006.01)
(52) U.S. Cl. ..................... 318/254; 318/138; 318/439
(58) Field of Classification Search ................ 318/254, 318/138, 439, 809, 810
See application file for complete search history.

(56) References Cited

U.S. PATENT DOCUMENTS

| | | | | |
|---|---|---|---|---|
| 4,140,952 A | * | 2/1979 | Miller | 318/478 |
| 4,772,839 A | * | 9/1988 | MacMinn et al. | 318/696 |
| 4,874,993 A | * | 10/1989 | Tanaka et al. | 318/254 |
| 5,604,412 A | * | 2/1997 | Okada et al. | 318/254 |
| 5,701,064 A | * | 12/1997 | Horst et al. | 318/701 |
| 5,783,917 A | * | 7/1998 | Takekawa | 318/439 |
| 5,821,786 A | * | 10/1998 | Nozuyama et al. | 327/141 |
| 5,854,548 A | * | 12/1998 | Taga et al. | 318/721 |
| 5,886,486 A | * | 3/1999 | Jeong et al. | 318/254 |
| 6,051,942 A | * | 4/2000 | French | 318/254 |
| 6,288,513 B1 | * | 9/2001 | Green | 318/700 |
| 6,483,270 B1 | * | 11/2002 | Miyazaki et al. | 318/700 |
| 6,664,750 B1 | * | 12/2003 | Pelonis | 318/439 |

FOREIGN PATENT DOCUMENTS

| | | |
|---|---|---|
| JP | 60-194782 | 10/1985 |
| JP | 2004-080931 | 3/2004 |
| JP | 2004-173482 | 6/2004 |

\* cited by examiner

*Primary Examiner*—Rita Leykin
(74) *Attorney, Agent, or Firm*—Pearne & Gordon LLP

(57) ABSTRACT

A rotor position determination device for determining a position of a rotor of a rotating electric machine relative to m-phase (m is an integer equal to or more than 2) armature coils, the rotating electric machine including a stator having the m-phase armature coils, and the rotor having a magnetic field, includes: transient current energizing means for performing, for each of the m-phase armature coils, a transient current energizing process for temporarily applying a DC voltage to the armature coil of each phase of the rotating electric machine to pass a transient current through the armature coil of each phase; and rotor position determination means for detecting the transient current passed through each of the m-phase armature coils and determining the position of the rotor relative to the m-phase armature coils from the detected transient currents.

8 Claims, 17 Drawing Sheets

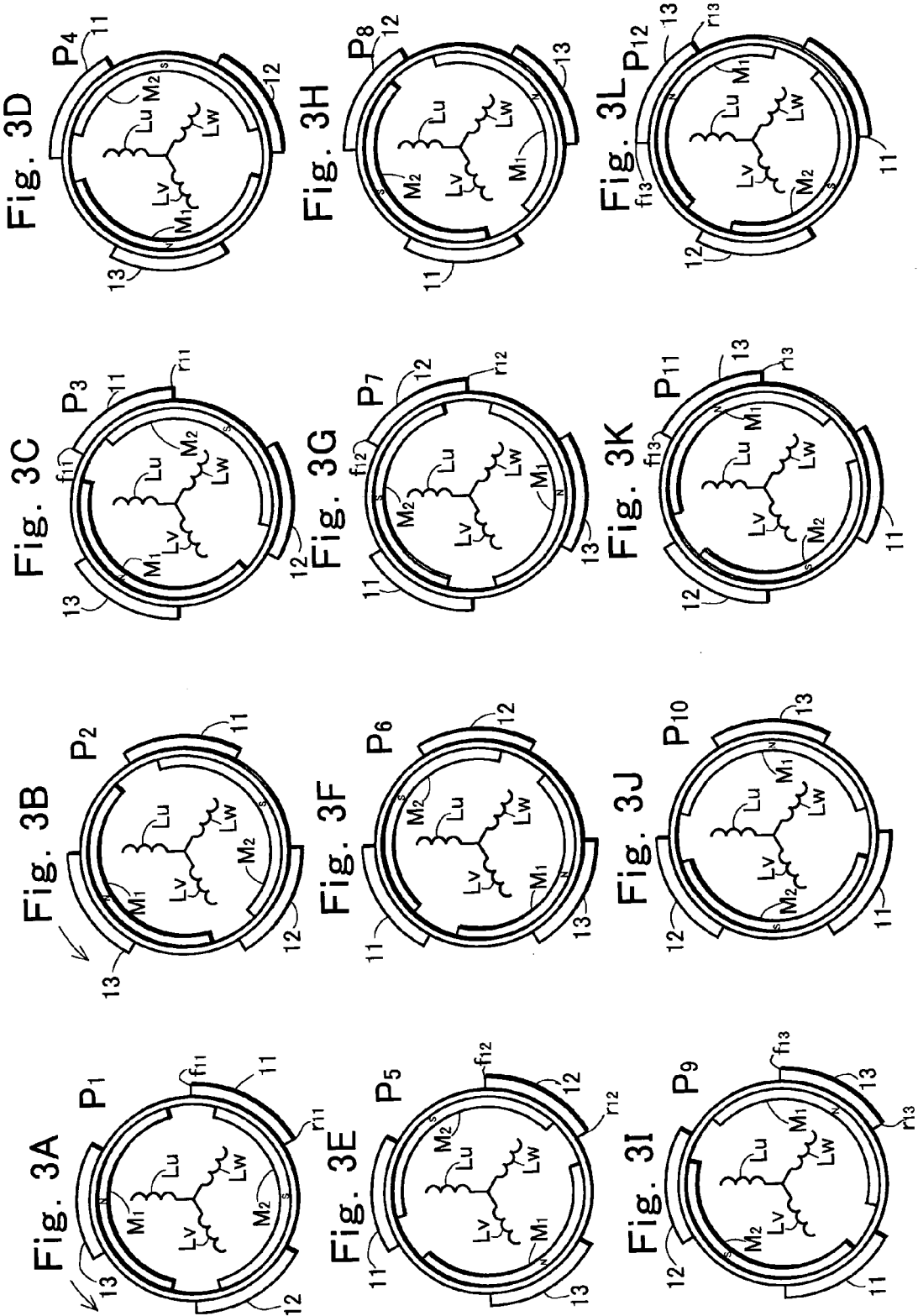

Fig. 8
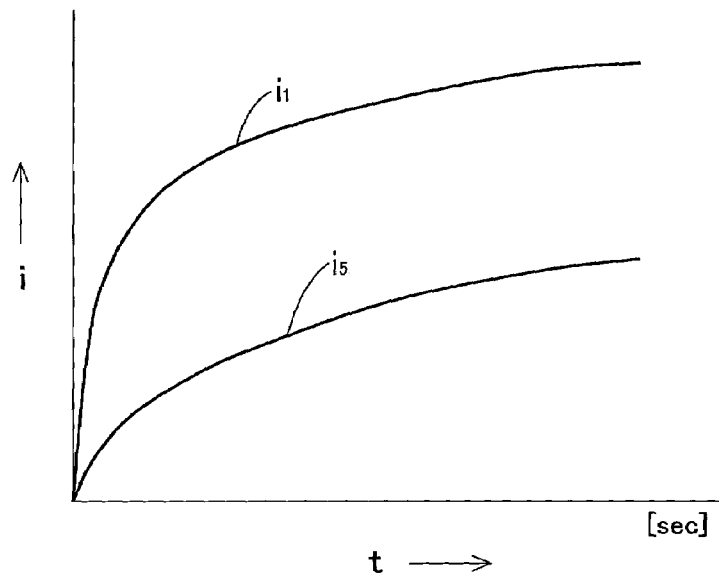
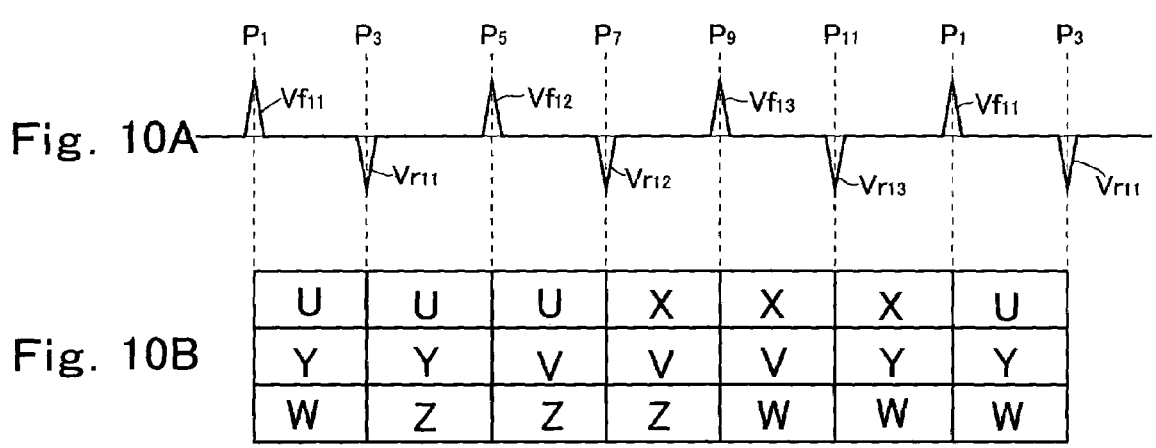
Fig. 10A
Fig. 10B

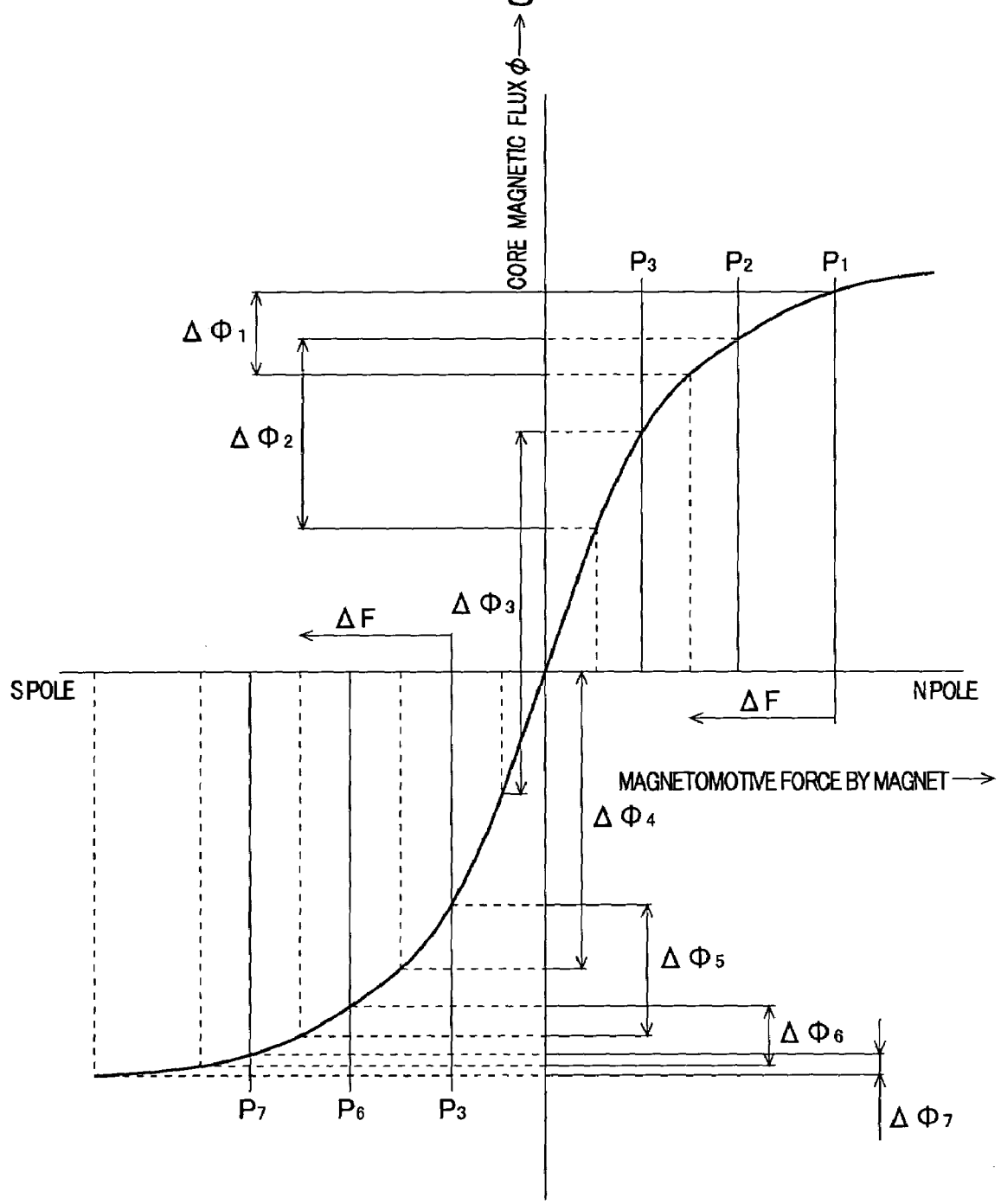

Fig. 12

| | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_1$ |
|---|---|---|---|---|---|---|---|---|---|---|---|---|---|
| u | $\Delta\phi_1$ | $\Delta\phi_2$ | $\Delta\phi_3$ | $\Delta\phi_4$ | $\Delta\phi_5$ | $\Delta\phi_6$ | $\Delta\phi_7$ | $\Delta\phi_6$ | $\Delta\phi_5$ | $\Delta\phi_4$ | $\Delta\phi_3$ | $\Delta\phi_2$ | $\Delta\phi_1$ |
| v | $\Delta\phi_5$ | $\Delta\phi_4$ | $\Delta\phi_3$ | $\Delta\phi_2$ | $\Delta\phi_1$ | $\Delta\phi_2$ | $\Delta\phi_3$ | $\Delta\phi_4$ | $\Delta\phi_5$ | $\Delta\phi_6$ | $\Delta\phi_7$ | $\Delta\phi_6$ | $\Delta\phi_5$ |
| w | $\Delta\phi_5$ | $\Delta\phi_6$ | $\Delta\phi_7$ | $\Delta\phi_6$ | $\Delta\phi_5$ | $\Delta\phi_4$ | $\Delta\phi_3$ | $\Delta\phi_2$ | $\Delta\phi_1$ | $\Delta\phi_2$ | $\Delta\phi_3$ | $\Delta\phi_4$ | $\Delta\phi_5$ |

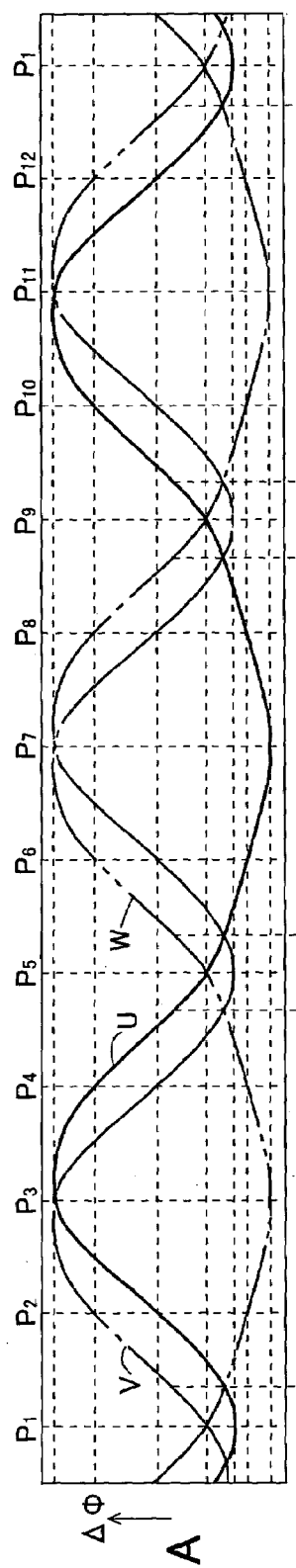
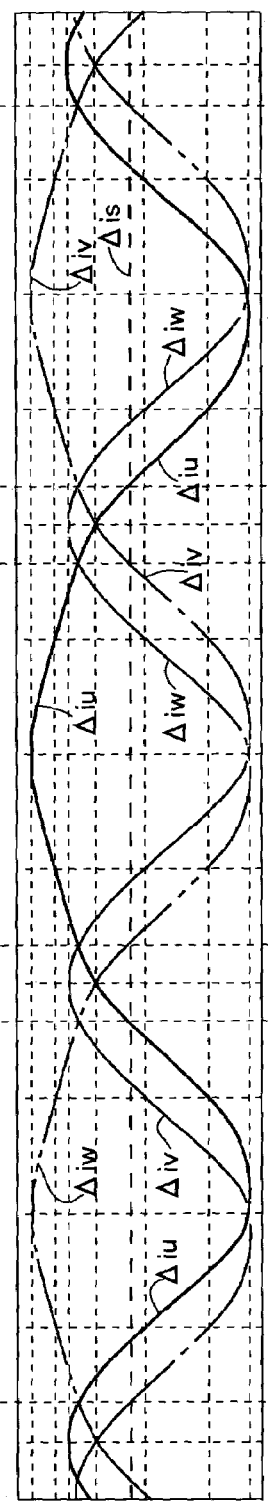
Fig. 13A
Fig. 13B
Fig. 13C

Fig. 15A  $\Delta iu$ 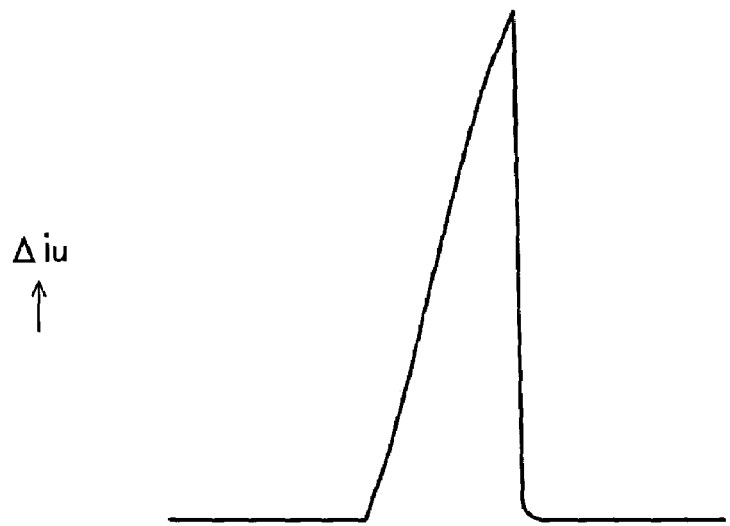
Fig. 15B  $\Delta iv$ 
Fig. 15C  $\Delta iw$ 

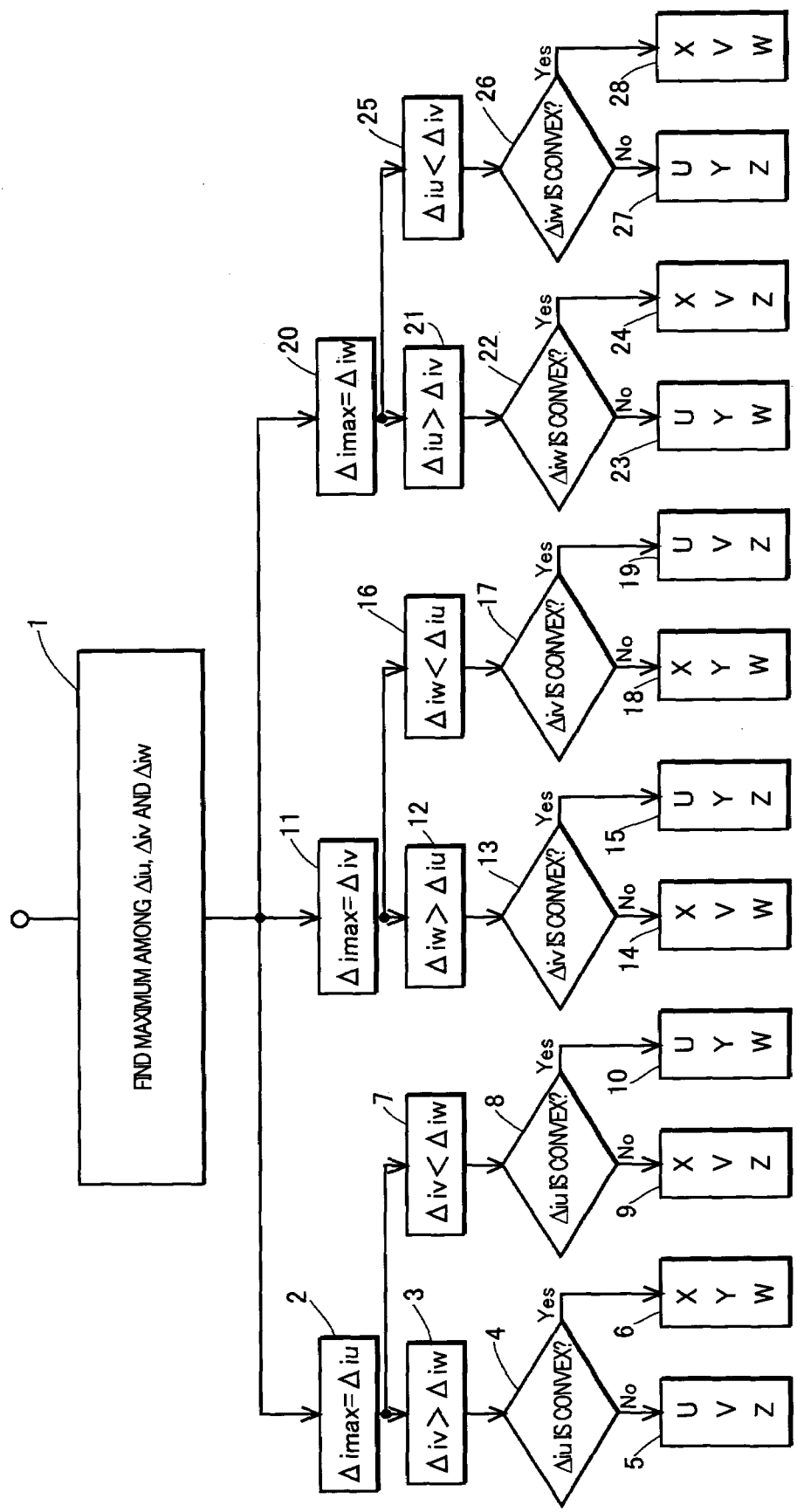

ROTOR POSITION DETERMINATION DEVICE OF ROTATING ELECTRIC MACHINE AND CONTROL DEVICE OF ROTATING ELECTRIC MACHINE

TECHNICAL FIELD OF THE INVENTION

The present invention relates to a rotor position determination device for determining a position of a rotor of a rotating electric machine, and a control device for controlling to operate the rotating electric machine as a motor by using the rotor position determination device.

BACKGROUND OF THE INVENTION

As a generator mounted in an internal combustion engine, a magneto generator comprised of a rotor that produces a magnetic field by mounting a permanent magnet to a rotor yoke, and a stator having polyphase armature coils has been used. A rotating electric machine comprised of a rotor having a magnetic field and a stator having polyphase armature coils operates as a generator when the rotor is externally driven. Such a rotating electric machine operates as a motor when a drive current is passed through the armature coils while an excitation phase is switched according to a relative positional relationship between the magnetic field of the rotor and the armature coils.

For example, an inverter circuit is provided between a battery and armature coils of a rotating electric machine comprised of a rotor having a magnetic field and a stator having polyphase armature coils, and a combination of switch elements of the inverter circuit that need to be turned on at each position of the rotor in order to rotate the rotor in a predetermined direction is regarded as a switch pattern, and the inverter circuit is controlled while the switch pattern is switched according to the position of the rotor (a positional relationship between the magnetic field of the rotor and the armature coil of each phase), thereby allowing the rotating electric machine to be operated as a motor.

Thus, the rotating electric machine comprised of the rotor having the magnetic field and the stator having the armature coils may be operated as both the generator and the motor, and as disclosed in Japanese Patent Application Laid-Open Publication No. 2004-80931, it has been considered that a rotating electric machine mounted in an internal combustion engine is operated as a motor at the start of the engine to start the internal combustion engine, and after the engine is started, the rotating electric machine is operated as a motor to charge a battery by using output of the rotating electric machine. Such a rotating electric machine is referred to as a starter generator.

When the rotating electric machine comprised of the rotor having the magnetic field and the stator having the polyphase armature coils is operated as the motor, as disclosed in Japanese Patent Application Laid-Open Publication No. 2004-80931, a polarity of a magnetic pole of a rotor is detected by a magnetic sensor comprised of a Hall element to detect a position of the rotor where a switch pattern of an inverter circuit is switched. A resolver has been also known as a sensor for detecting a position where a switch pattern is switched.

As disclosed in Japanese Patent Application Laid-Open Publication No. 2004-173482, it has been proposed that when a rotating electric machine of a magnetic field rotation type is operated as a magneto generator, an AC control voltage is applied to an armature coil of a stator from voltage storage means such as a battery or a capacitor provided on a load side of the generator via an inverter circuit to control output of the generator.

In the magneto generator, the magnetic field of the rotor is produced by a permanent magnet, and thus the magnetic field cannot be controlled by a method similar to that for a generator having magnetic field winding to control an output of the generator.

Thus, in the invention disclosed in Japanese Patent Application Laid-Open Publication No. 2004-173482, the generating device is comprised so as to apply the AC control voltage having the same frequency as an induced voltage of the armature coil to the armature coil from the voltage storage means such as the battery or the capacitor provided on the load side via the inverter circuit, wherein a phase of the AC control voltage is changed to change a magnetic flux linking the armature coil and change an output characteristic of a magneto generator.

When the rotating electric machine of the magnetic field rotation type is operated as the generator, the AC control voltage having the same frequency as the induced voltage of the armature coil is applied to the armature coil to change a phase angle of the AC control voltage to a delayed side relative to a phase of a no-load induced voltage of the armature coil, thereby generally increasing an output of the generator. The phase angle of the AC control voltage is changed to an advanced side, thereby reducing the output of the generator. The phase angle of the AC control voltage relative to the phase of the no-load induced voltage of the armature coil is referred to as a "control angle".

As described above, when the rotating electric machine of the magnetic field rotation type is operated as the generator, depending on whether the output of the generator (an output voltage or an output current) is lower or higher than a target value, the control angle is changed to the delayed side or the advanced side to allow control for matching the output of the generator with the target value. Such control that the generating device is comprised so as to apply the AC control voltage to the armature coil from the voltage storage means provided on the load side via the inverter circuit, and the phase angle of the AC control voltage is controlled to adjust the output of the generator is referred to as "drive control", which means controlling the output of the generator while driving the generator from the load side.

In the drive control, a position of a rotor (a relative positional relationship between a magnetic field and an armature coil of each phase of a stator) needs to be detected in order to determine the phase angle of the AC control voltage. The position of the rotor can be detected by using a Hall element. In the invention disclosed in Japanese Patent Application Laid-Open Publication No. 2004-173482, however, the position of the rotor is detected by using a signal generating device that detects an edge of a reluctor to generate a pulse signal when a rotational angle position of the rotor matches a predetermined position.

For a brushless motor, as disclosed in Japanese Patent Application Laid-Open Publication No. 60-194782, a method has been known for detecting a position of a rotor from changes in reverse induced voltages of armature coils without using a sensor such as a Hall element. In the method disclosed in Japanese Patent Application Laid-Open Publication No. 60-194782, a resistor circuit comprised of three resistors star-connected is connected in parallel with three-phase armature coils star-connected, the sum of the reverse induced voltages of the three-phase armature coils is detected from a potential difference between a neutral point of the armature coils and a neutral point of the resistor circuit, and the position of the rotor is detected based on a change in the sum of the reverse induced voltages.

The Hall element has low heat resistance, and thus if the Hall element is used as a sensor for detecting the position of the rotor where a switch pattern of an inverter circuit for controlling supply of a drive current to armature coils is switched when a rotating electric machine is used in high temperature environments such as when a rotating electric machine comprised of a magnet rotor mounted to a crankshaft of an internal combustion engine and a stator having polyphase armature coils is operated as a brushless motor to start the engine, the Hall element may be damaged by heat from its surroundings.

When a resolver is used as a sensor for detecting the position of the rotor where the switch pattern of the inverter circuit is switched, the resolver itself is expensive, and a detection circuit for detecting a phase difference between an excitation voltage and an output voltage is required, which increases costs of a rotating electric machine.

As disclosed in Japanese Patent Application Laid-Open Publication No. 2004-173482, if the position of the rotor is detected by using the signal generating device that detects the edge of the reluctor to generate the pulse signal, the sensor having low heat resistance need not be used. However, the signal generating device that detects the edge of the reluctor to generate the pulse does not generate an output without rotation of the rotating electric machine, and thus the method using such a signal generating device cannot be used for detecting the position of the rotor at the start of the rotating electric machine when operated as the brushless motor.

Similarly, as disclosed in Japanese Patent Application Laid-Open Publication No. 60-194782, the method for detecting the position of the rotor from the changes in the reverse induced voltages of the armature coils can be applied only when the rotating electric machine is rotated and the armature coils generate the reverse induced voltages, and thus cannot be used as the method for detecting the position of the rotor at the start of the rotating electric machine.

SUMMARY OF THE INVENTION

An object of the present invention is to provide a rotor position determination device of a rotating electric machine capable of detecting a position of a rotor without using a Hall element having low heat resistance or an expensive resolver.

Another object of the present invention is to provide a control device of a rotating electric machine capable of controlling excitation of armature coils so as to operate the rotating electric machine as a motor without using a Hall element having low heat resistance or an expensive resolver.

In the rotating electric machine to which the present invention is applied, a magnetic field of the rotor may be produced by a permanent magnet mounted to a rotor yoke or by passing an excitation current through an excitation coil wound around a rotor core.

The rotor position determination device according to the present invention is a device for determining a position of a rotor of a rotating electric machine relative to m-phase (m is an integer equal to or more than 2) armature coils, the rotating electric machine including a stator having the m-phase armature coils, and the rotor having a magnetic field. The rotor position determination device according to the present invention includes: transient current energizing means for performing, for each of the m-phase armature coils, a transient current energizing process for temporarily applying a DC voltage to the armature coil of each phase of the stator to pass a transient current through the armature coil of each phase; and rotor position determination means for detecting the transient current passed through each of the m-phase armature coils in the transient current energizing process and determining the position of the rotor relative to the m-phase armature coils from the detected transient currents.

When the m-phase armature coils are star-connected, the transient current energizing means is comprised so as to perform, for each of the m-phase armature coils, a process for temporarily apply a DC voltage between a non-neutral point side terminal of the armature coil of each phase and a grounded potential portion to pass the transient current through the armature coil of each phase.

The rotor position determination means may be comprised so as to determine the position of the rotor relative to the m-phase armature coils from peak values of the transient currents.

The rotor position determination means may be comprised so as to determine the position of the rotor relative to the m-phase armature coils from peak values and waveforms of the transient currents.

In the rotating electric machine, a magnetic flux passing through an armature core when no current passes through the armature coils differs according to a relative positional relationship between the position of the magnetic field and the armature coil of each phase (the position of the rotor relative to the armature coil of each phase), and an inductance of the armature coil of each phase differs according to the position of the rotor. Thus, the transient current passing through the armature coil of each phase of the rotating electric machine when the voltage is applied to the armature coil of each phase differs according to the position of the rotor. Therefore, the process for temporarily applying the DC voltage to the armature coil of each phase of the stator of the rotating electric machine to pass the transient current through the armature coil of each phase is performed for each of the m-phase armature coils, and the peak values or the waveforms of the transient currents passed through the m-phase armature coils are compared to allow determination of the position of the rotor relative to the armature coil of each phase.

To determine the position of the rotor from the waveform of the transient current, features of the waveforms of the transient currents passed through the m-phase armature coils may be extracted and compared. The features of the waveforms of the transient currents may be extracted by the following methods (a) to (c):

(a) Current values after a lapse of a fixed time $\tau$ from the application of the DC voltage to the armature coils are measured and compared.

(b) After the transient currents start to pass, times required for the transient currents to reach a fixed current value are measured and compared.

(c) A waveform is determined from a rate of change with time at a leading edge of the transient current.

(d) A rate of change with time $\Delta i1/\Delta t$ in the first half and a rate of change with time $\Delta i2/\Delta t$ in the second half of a transient current waveform having a time width $2\Delta t$ are calculated to determine whether a difference between the rate of change with time $\Delta i1/\Delta t$ in the first half and the rate of change with time $\Delta i2/\Delta t$ in the second half is a set value or more.

According to the present invention, there is also provided a control device of a rotating electric machine for controlling supply of a drive current to m-phase armature coils to operate as a motor the rotating electric machine including a stator having m-phase (m is an integer equal to or more than 2) armature coils star-connected so as to have a neutral point, and a rotor having a magnetic field.

The control device according to the present invention includes: a bridge-type inverter circuit having a DC terminal to which an output of DC power is applied and m number of AC terminals to which m number of non-neutral point side terminals of the m-phase armature coils are connected; a transient current energizing switch provided between a neutral point of the m-phase armature coils and a grounded potential portion; current detection means for detecting a current passing through the transient current energizing switch; and a controller for controlling the inverter circuit and the transient current energizing switch.

In this case, the controller includes: transient current energizing means for controlling switch elements of the inverter circuit and the transient current energizing switch to perform, for each of the m-phase armature coils, a process for temporarily applying a DC voltage between a non-neutral point side terminal of the armature coil of each phase of the stator and the grounded potential portion to pass a transient current through the armature coil of each phase; rotor position determination means for detecting the transient current passed through each of the m-phase armature coils by the transient current energizing means and determining a position of the rotor relative to the m-phase armature coils; switch pattern deciding means for deciding as a switch pattern a combination of switch elements of the inverter circuit that need to be turned on in order to rotate the rotor in a predetermined direction based on the position of the rotor determined by the rotor position determination means; and inverter control means for controlling the inverter circuit so as to turn on the switch elements of the inverter circuit according to the switch pattern decided by the switch pattern deciding means.

The rotor position determination means may be comprised so as to determine the position of the rotor relative to the m-phase armature coils from peak values of the transient currents, or comprised so as to determine the position of the rotor relative to the m-phase armature coils from peak values and waveforms of the transient currents.

Preferably, the control device of the rotating electric machine according to the present invention includes: a signal generating device that detects an edge of a reluctor to generate a pulse signal when a rotational angle position of the rotor matches a predetermined position; a bridge-type inverter circuit having a DC terminal to which an output of DC power is applied and m number of AC terminals to which m number of non-neutral point side terminals of the m-phase armature coils are connected; a transient current energizing switch provided between a neutral point of the m-phase armature coils and a grounded potential portion; current detection means for detecting a current passing through the transient current energizing switch; and a controller for controlling the inverter circuit and the transient current energizing switch.

In this case, the controller includes: transient current energizing means for controlling switch elements of the inverter circuit and the transient current energizing switch so as to perform, for each of the m-phase armature coils, a process for temporarily applying a DC voltage between a non-neutral point side terminal of the armature coil of each phase of the stator and the grounded potential portion to pass a transient current through the armature coil of each phase; first rotor position determination means for detecting the transient current passed through each of the m-phase armature coils by the transient current energizing means and determining the position of the rotor relative to the m-phase armature coils from the detected transient currents; first switch pattern deciding means for deciding as a switch pattern a combination of switch elements of the inverter circuit that need to be turned on in order to rotate the rotor in a predetermined direction based on the position of the rotor determined by the first rotor position determination means; first inverter control means for controlling the inverter circuit so as to turn on the switch elements of the inverter circuit according to the switch pattern decided by the first switch pattern deciding means; second rotor position determination means for determining the position of the rotor relative to the m-phase armature coils of the stator based on rotational angle information of the rotor obtained from a pulse signal generated by the signal generating device; second switch pattern deciding means for deciding as a switch pattern a combination of switch elements of the inverter circuit that need to be turned on in order to rotate the rotor in a predetermined direction based on the position determined by the second rotor position determination means; second inverter control means for controlling the inverter circuit so as to turn on the switch elements of the inverter circuit according to the switch pattern decided by the second switch pattern deciding means; and control switching means for switching control so that the inverter circuit is controlled by the first inverter control means at the start of the rotating electric machine, and after the signal generating device enters a state of generating a pulse signal having a level equal to or higher than a threshold, the inverter circuit is controlled by the second inverter control means.

With such a configuration, in a state where the rotating electric machine is stopped and the signal generating device cannot generate the pulse signal, an excitation current is passed through the armature coil of an excitation phase decided based on the position of the rotor determined from the transient currents passed through the armature coils to start the rotating electric machine. After the rotating electric machine is started, and a rotational speed of the rotating electric machine increases to generate a pulse signal having a level that can be identified by the signal generating device, the excitation phase is decided based on the position of the rotor determined by using the rotational angle information obtained from the pulse signal output by the signal generating device to excite the armature coil, thereby allowing the rotating electric machine to be rotated similarly to a brushless motor.

Preferably, the signal generating device is comprised so as to generate the pulse signal at a position where the switch pattern is switched. Using such a signal generating device allows the switch pattern to be switched every time the signal generating device generates a pulse signal, thereby facilitating the control for switching the switch pattern.

As described above, according to the present invention, the process for temporarily applying the DC voltage to the armature coil of each phase of the stator to pass the transient current through the armature coil of each phase is performed for each of the m-phase armature coils to determine the position of the rotor relative to the armature coil of each phase from the waveform of the transient current passed through each of the m-phase armature coils. This allows the position of the rotor relative to the armature coils to be determined without using a sensor having low heat resistance such as a Hall element or an expensive sensor such as a resolver.

According to the control device of the rotating electric machine of the present invention, when the rotating electric machine is operated as the motor, the inverter circuit is controlled by the switch pattern decided based on the position of the rotor determined from the transient currents to pass the current through the armature coils to start the rotor, and after the start, the switch pattern is switched by using the positional information of the rotor obtained from the output of the signal generating device that detects the edge of the reluctor to generate the pulse signal to rotate the rotor. This allows the rotating electric machine to be operated as the motor without using a sensor having low heat resistance such as a Hall element or an expensive sensor such as a resolver.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIGS. 3A to 3L show changes in a positional relationship between armature coils and a rotor;

FIG. 8 is a graph showing transient currents when the position of the rotor is different;

FIG. 10A is a waveform illustration of a pulse signal generated by a pulser of a signal generating device after the rotating electric machine is started as a motor, and FIG. 10B is a table showing changes in switch patterns;

FIG. 11 is a graph showing the relationship between changes in the position of the rotor and the magnetic fluxes passing through the core;

FIG. 12 is a table collectively showing changes in the magnetic fluxes passing through U-phase to W-phase cores when the transient currents are passed through U-phase to W-phase armature coils in a state where the rotor is at positions P1 to P12 in FIG. 3;

FIG. 13A is a graph showing the changes in the magnetic fluxes passing through the U-phase to W-phase cores by the transient currents, FIG. 13B is a graph showing peak values Δiu, Δiv and Δiw of the detected transient currents, FIG. 13C is a table showing initial switch patterns when the rotor is at positions P1 to P13 in FIG. 3 as control for the inverter circuit by 180° switching control;

FIGS. 15A to 15C are waveform illustrations of the transient currents passing through the U-phase to W-phase armature coils in the transient current energizing process when the rotor is at the position P7 in FIG. 3;

FIG. 17 is a flowchart of an example of an algorithm of a program executed by a microprocessor for constructing first switch pattern determination means of the control device in FIG. 2;

DETAILED DESCRIPTION OF THE PREFERRED EMBODIMENTS

Figure 1:
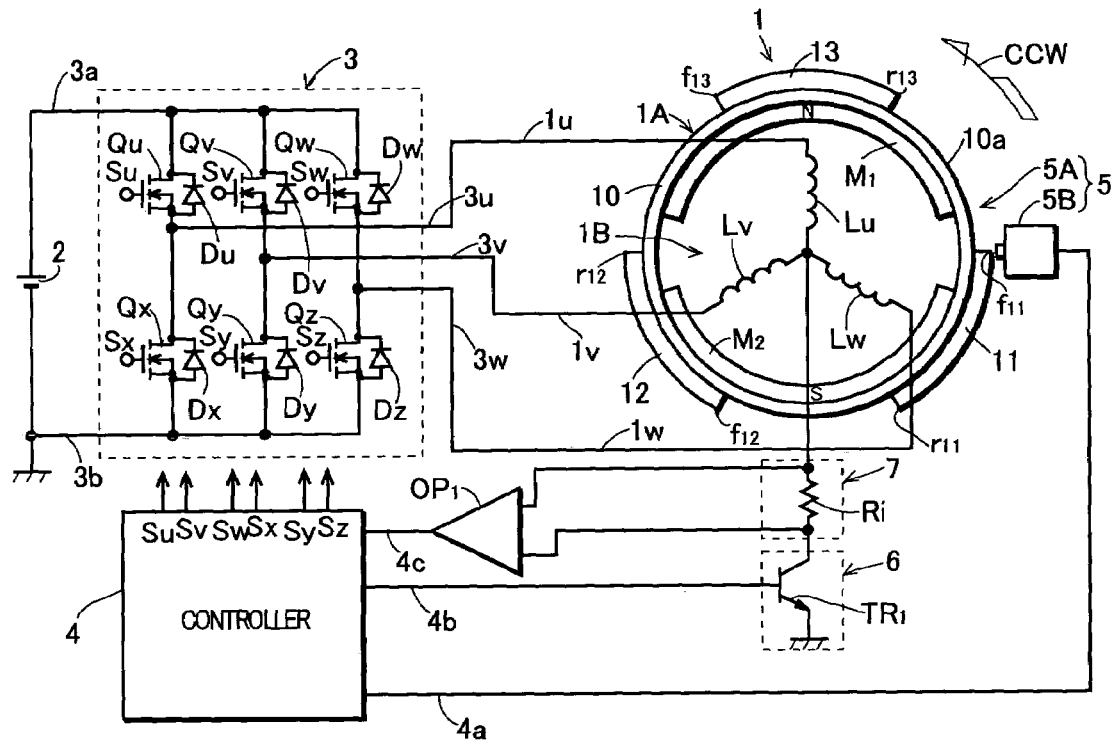
FIG. 1 is a circuit diagram of a construction of hardware according to an embodiment of the present invention.

Now, preferred embodiments of the present invention will be described with reference to the drawings. FIG. 1 shows a construction of hardware according to an embodiment in which the present invention is applied to a rotating electric machine used as a starter generator. The rotating electric machine according to the embodiment is mounted in an internal combustion engine, operated as a brushless motor at the start of the engine, and after the engine is started, the rotating electric machine is operated as a magneto generator to charge a battery.

In FIG. 1, reference numerals 1 and 2 denote a rotating electric machine and a battery, respectively, and 3 denotes an inverter circuit provided between the rotating electric machine 1 and the battery 2. A reference numeral 4 denotes a controller that has a microprocessor and controls the inverter circuit 3. A reference numeral 5 denotes a signal generating device that generates a pulse signal when a position of a rotor of the rotating electric machine 1 matches a predetermined position. A reference numeral 6 denotes a transient current energizing switch that is closed when a transient current is passed through an armature coil of the rotating electric machine 1, and 7 denotes current detection means for detecting the transient current.

More specifically, in FIG. 1, a reference numeral 10 denotes a rotor yoke made of a ferromagnetic material such as iron and formed into a substantial cup shape. The rotor yoke is mounted in the internal combustion engine (not shown), with a boss provided on a center of a bottom wall of the rotor yoke being fitted to a crankshaft of the engine.

A permanent magnet is mounted to an inner periphery of a peripheral wall 10a of the rotor yoke 10 to produce a magnetic field with even number of poles. In the embodiment, two arcuate permanent magnets M1 and M2 placed at a 180° interval are mounted to the inner periphery of the peripheral wall 10a of the rotor yoke 10 by bonding or the like, and the permanent magnets are radially polarized in different polarizing directions to produce the magnetic field with two poles on the inner periphery of the rotor yoke. A rotor 1A is comprised of the rotor yoke 10 and the permanent magnets M1 and M2. In this embodiment, the magnet rotor 1A is rotated counterclockwise (in a direction of the arrow CCW) in FIG. 1 during a forward rotation of the internal combustion engine.

A stator 1B is placed inside the magnet rotor 1A. The stator 1B is comprised of a known annular star type armature core (not shown) having a structure in which three salient poles radially protrude from an outer periphery of an annular yoke, and three-phase armature coils Lu to Lw wound around the three salient poles of the armature core. The three-phase armature coils Lu to Lw are star-connected, and three-phase terminals 1u, 1v and 1w are drawn from ends opposite a neutral point of the armature coils.

The stator 1B is secured to a stator mounting portion formed on part of a casing of the internal combustion engine, and a magnetic pole portion formed on a tip of each of the three salient poles of the armature core faces a magnetic pole of a magnetic field of the magnet rotor 1A with a predetermined gap therebetween.

Three reluctors 11 to 13 constituted by arcuate protrusions extending circumferentially of the peripheral wall 10a are formed at 120° intervals on an outer periphery of the peripheral wall 10a of the rotor yoke 10, and a signal generating rotor 5A is comprised of the reluctors 11 to 13 and the rotor yoke 10. A pulser (pulse signal generator) 5B is placed near the signal generating rotor 5A, and the signal generating device 5 of a magnetic flux change detection type that generates a pulse signal when detecting changes in the magnetic flux is comprised of the rotor 5A and the pulser 5B. A pulser 5B generates pulse signals with different polarities when a leading edge and a trailing edge in a rotational direction are detected.

The pulser 5B is secured to the casing or the like of the engine. When the leading edge in the rotational direction of each of the reluctors 11 to 13 is detected, the pulser 5B generates a pulse signal with a first polarity, and when the trailing edge in the rotational direction of each of the reluctors 11 to 13 is detected, the pulser 5B generates a pulse signal with a second polarity.

In the embodiment, each reluctor has a polar arc angle of 60°, and the three reluctors 11 to 13 are provided at the 120° intervals, and thus the pulser 5B generates six pulse signals at 60° intervals during one rotation of the rotor 1A. The reluctors 11 to 13 and the pulser 5B are provided so that timings of generation of the six pulse signals match six switching timings (switching timings of an excitation phase) of switch patterns of the inverter circuit when the rotating electric machine is operated as a brushless motor by 120° switching control or 180° switching control.

The pulse signal generated by the pulser 5B is input to a pulse signal input terminal 4a of the controller 4. The pulse signal input to the pulse signal input terminal 4a is converted into a signal that can be identified by a microprocessor by a waveform rectifier circuit provided in the controller 4, and input to the microprocessor in the controller 4.

The inverter circuit 3 is comprised of a known circuit with each side of a three-phase bridge circuit being constituted by elements including switch elements that can be controlled on/off and feedback diodes connected in anti-parallel. In the shown example, three upper sides of a bride are constituted by three elements including switch elements Qu, Qv and Qw each having one end connected in common and diodes Du, Dv and Dw connected in anti-parallel with the switch elements, and three lower sides of the bridge are constituted by three elements including switch elements Qx, Qy and Qz each having one end connected to the other end of each of the switch elements Qu, Qv and Qw and the other end connected in common, and feedback diodes Dx, Dy and Dz connected in anti-parallel with the switch elements.

Switch elements used as the switch elements Qu to Qw and Qx to Qz keep an ON state only while a drive signal is provided, and enters an OFF state when the drive signal is removed. In the embodiment, MOSFETs are used as the switch elements that constitute each side of the bridge of the inverter circuit 3, and parasitic diodes formed between drain and source of the MOSFETs are used as feedback diodes.

In the shown inverter circuit 3, a common connection point of one ends of the switch elements Qu, Qv and Qw and a common connection point of the other ends of the switch elements Qx, Qy and Qz are positive and negative DC terminals 3a and 3b, respectively, and connection points of the other ends of the switch elements Qu, Qv and Qw and one ends of the switch elements Qx, Qy and Qz are AC terminals 3u, 3v and 3w, respectively. The battery 2 is connected between the DC terminals 3a and 3b, and three-phase terminals 1u, 1v and 1w drawn from non-neutral point side terminals (terminals opposite from the neutral point) of the armature coils Lu, Lv and Lw are connected to the AC terminals 3u, 3v and 3w.

In the shown inverter circuit 3, a full-wave rectifier circuit is constituted by the diodes Du, Dv, Dw, Dx, Dy and Dz, and when the rotating electric machine 1 is externally driven and operated as a magneto generator, a three-phase AC voltage induced in the armature coils Lu to Lw is converted into a DC voltage by the full-wave rectifier circuit and applied to the battery 2.

In the embodiment, in order to determine the position of the rotor 1A (a positional relationship between a magnetic field of the rotor and the armature coil of each phase) during stop of the rotating electric machine 1, the transient current energizing switch 6 and the current detection means 7 are connected in series between the neutral point of the armature coils Lu to Lw and the ground. In the shown example, the current detection means 7 is constituted by a shunt resistor Ri and one end of the resistor Ri is connected to the neutral point of the armature coil.

The transient current energizing switch 6 is constituted by an NPN transistor with an emitter being grounded, a collector of the transistor is connected to the other end of the resistor Ri. A base of the transistor is connected to a switch control signal output terminal 4b provided on the controller 4. Detection signals obtained across the resistor Ri are input to a transient current detection signal input terminal 4c of the controller 4 via an arithmetical operation amplifier OP1.

As described above, with the rotor position determination method according to the present invention, a transient current energizing process for performing, for each of the three-phase armature coils, a process for temporarily applying a DC voltage to the armature coil of each phase of the stator 1B to pass the transient current through the armature coil of each phase, and a rotor position determination process for determining the position of the rotor relative to the three-phase armature coils from the transient currents passed through the three-phase armature coils in the transient current energizing process and determining the position of the rotor relative to the three-phase armature coils are performed to determine the position of the rotor 1A. An excitation phase is decided that is required for rotating the rotor in a predetermined direction based on the position of the rotor thus determined, the switch pattern of the inverter circuit 3 is decided so as to pass an excitation current through the armature coil of the decided excitation phase, and the switch elements of the inverter circuit are controlled on/off with the switch pattern.

Figure 2:
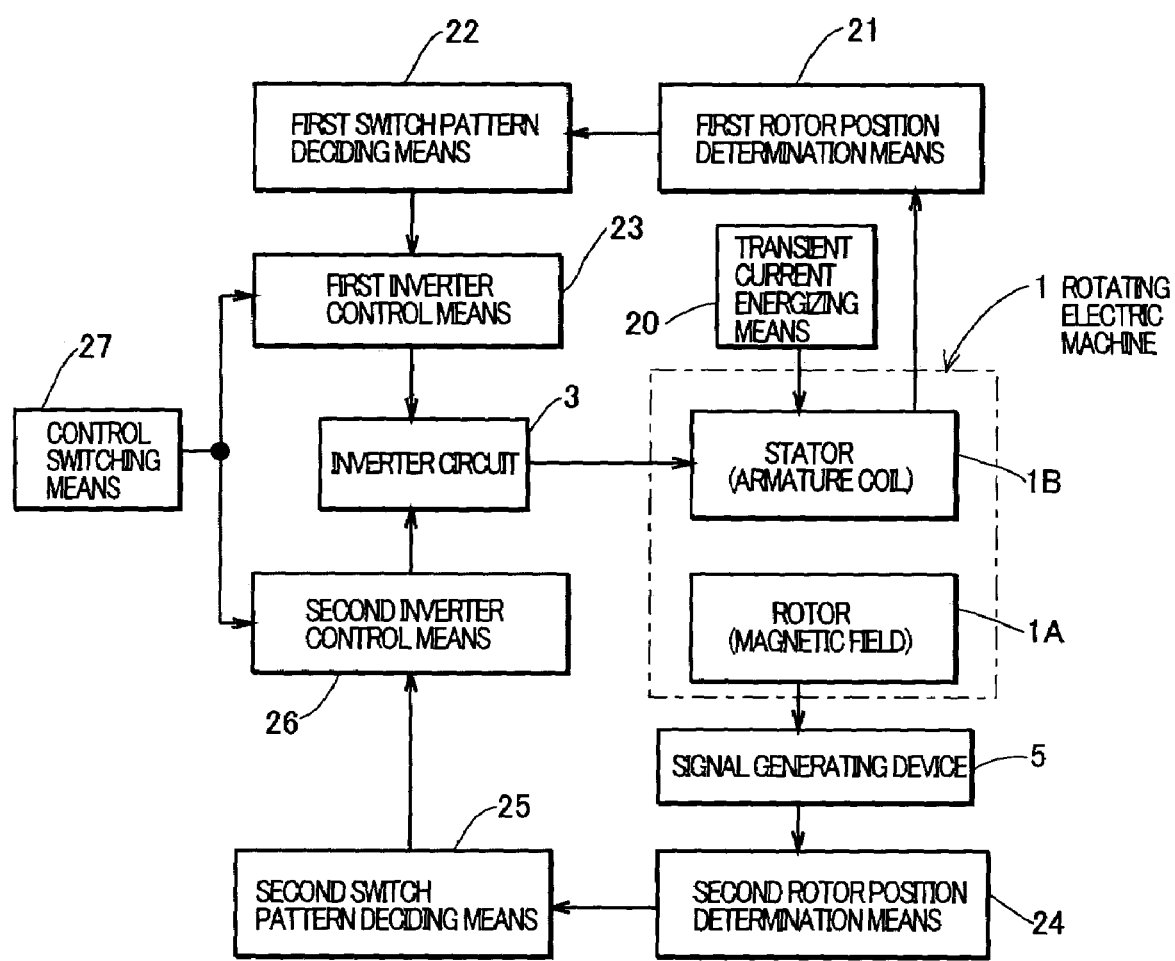
FIG. 2 is a block diagram of a construction of a control device including various means constructed by a microprocessor of a controller in the embodiment in FIG. 1.

In order to perform the rotor position determination method according to the present invention and use the determination results to control to operate the rotating electric machine as a brushless motor, a predetermined program is executed by the microprocessor of the controller 4 to construct various means in FIG. 2. In FIG. 2, a reference numeral 20 denotes transient current energizing means, which performs, for each of the three-phase armature coils, a transient current energizing process for temporarily connecting the neutral point to the grounded potential portion in a state where a voltage is applied between a terminal opposite from the neutral point of the armature coil of each phase of the stator 1B and the grounded potential portion to pass the transient current through the armature coil of each phase.

A reference numeral 21 denotes first rotor position determination means, which performs processing for detecting the transient currents passed through the three-phase armature coils by the transient current energizing means 20 from an output of the current detection means 7 and determining the position of the magnetic field of the rotor 1A relative to the three-phase armature coils Lu to Lw from the detected transient currents.

In the embodiment, the rotor position detection device is comprised of the transient current energizing means 20 and the first rotor position determination means 21.

A reference numeral 22 denotes first switch pattern deciding means, and 23 denotes first inverter control means. The first switch pattern deciding means 22 decides as a switch pattern a combination of the switch elements of the inverter circuit 3 that need to be turned on in order to rotate the rotor 1A in a predetermined direction (in the embodiment, the direction of the arrow CCW) based on the position of the rotor determined by the first rotor position determination means 21. The first inverter control means 23 controls the inverter circuit 3 so as to turn on the switch elements of the inverter circuit 3 according to the switch pattern decided by the first switch pattern deciding means 22.

A reference numeral 24 denotes second rotor position determination means for determining the position of the rotor 1A relative to the three-phase armature coils Lu to Lw of the stator 1B based on positional information of the rotor 1A obtained from the pulse signal generated by the signal generating device 5, 25 denotes second switch pattern deciding means for deciding as a switch pattern a combination of the switch elements of the inverter circuit that need to be turned on in order to rotate the rotor in a predetermined direction based on the position determined by the second rotor position determination means 24, and 26 denotes second inverter control means for controlling the inverter circuit so as to turn on the switch elements of the inverter circuit 3 according to the switch pattern decided by the second switch pattern deciding means 25.

Further, a reference numeral 27 denotes control switching means, which switches control so that the inverter circuit is controlled by the first inverter control means 23 at the start of the rotating electric machine when the signal generating device 5 generates no signal, and after a rotational speed of the rotating electric machine increases to a rotational speed at which the signal generating device 5 generates a pulse signal having a level equal to or higher than a threshold, the inverter circuit is controlled by the second inverter control means 26.

The control switching means may be comprised so as to detect the rotational speed of the rotor and switch from control by the first inverter control means 23 to control by the second inverter control means 26 when the detected rotational speed exceeds a set value, or comprised so as to switch from the control by the first inverter control means 23 to the control by the second inverter control means 26 when the microprocessor comes to identify the output pulse signal of the signal generating device 5.

Now, the principle of the rotor position detection method according to the present invention will be described. In the rotating electric machine 1 in FIG. 1, the armature coil of each phase is wound so that the polarity of the salient pole on which the armature coil of each phase is wound is an N pole seen from the outside when the current passes from the terminal opposite from the neutral point of the armature coil of each phase.

Figure 4:
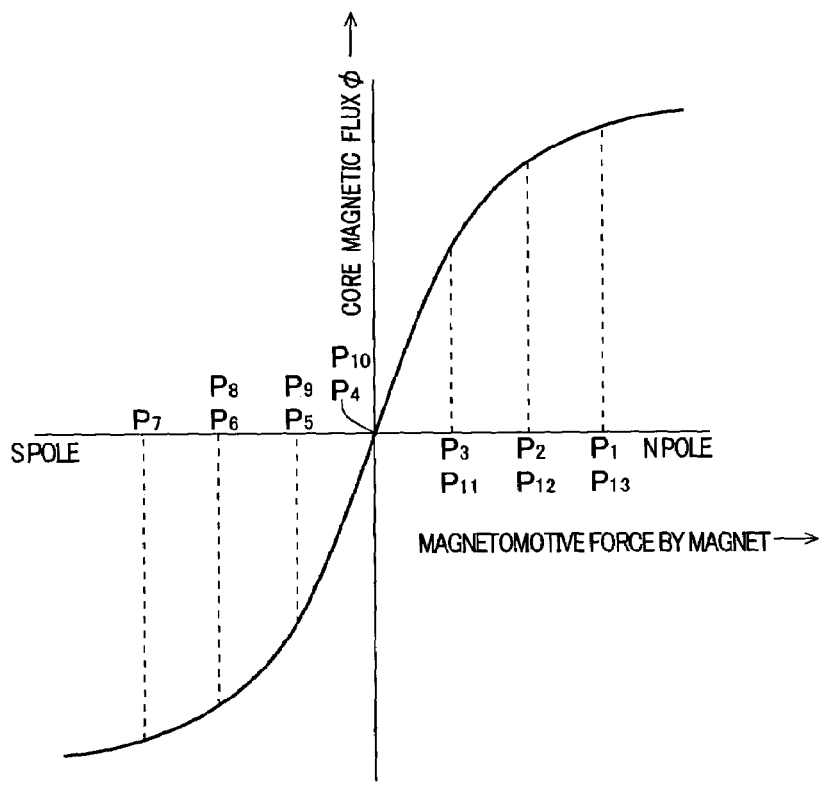
FIG. 4 is a graph showing a relationship between changes in a position of a magnetic field of the rotor and a magnetic flux passing through an armature core.

If no current passes thorough the three-phase armature coils, the volume of the magnetic flux passing through the armature core of the stator differs according to the positional relationship between the magnetic field and the armature coil of each phase. If the rotor 1A is rotated stepwise by 30° counterclockwise, the positions P1 to P12 placed in different positions at 30° intervals as shown in FIGS. 3A to 3L are considered, and a magnetic flux φ passing through the U-phase armature core at the positions P1 to P12 with respect to a magnetomotive force by a magnet is as shown in FIG. 4. At the positions P6 and P8, the positions of the rotor are in line symmetry, and the magnetic flux passing through the U-phase armature core is the same. Similarly, the positions of the rotor at the positions P9 to P12 are in line symmetry with the positions of the rotor at the positions P5 to P2, and thus the volumes of the magnetic fluxes passing through the U-phase armature core at the positions P9, P10, P11 and P12 are the same as the volumes of the magnetic fluxes passing through the U-phase armature core at the positions P5, P4, P3 and P2. The position P13 shown in FIG. 4 is the same as the position P1, and the magnetic flux passing through the U-phase armature core at the position P13 is the same as the magnetic flux passing through the U-phase armature core at the position P1.

As described above, in the rotating electric machine comprised of the rotor having the magnetic field and the stator having the m (m is equal to three in the embodiment) phase armature coils, the magnetic flux passing through the armature core when no current passes through the armature coil differs according to the relative positional relationship between the position of the magnetic field and the armature coil of each phase (the position of the rotor relative to the armature coil of each phase), an inductance of the armature coil of each phase differs according to the position of the rotor, and therefore the transient current passing through the armature coil of each phase differs according to the position of the rotor. Thus, the process for applying the DC voltage to the armature coil of each phase of the stator to pass the transient current through the armature coil of each phase is performed for each of the m-phase armature coils, and features of the transient currents passed through the m-phase armature coils are extracted and compared to allow determination of the position of the rotor relative to the armature coil of each phase.

Figure 5:
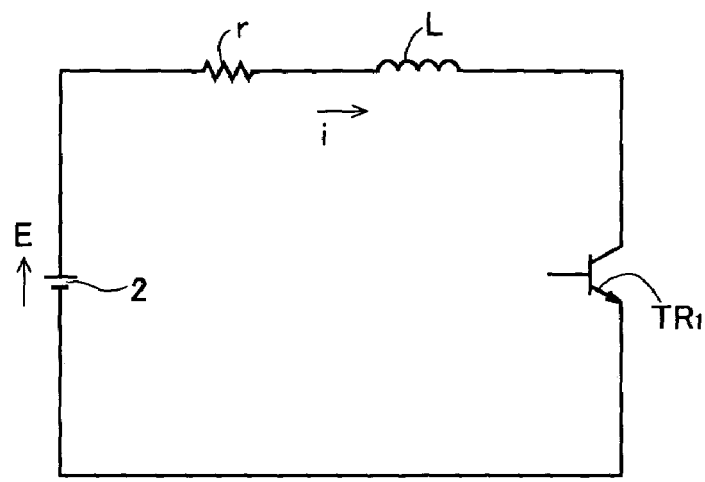
FIG. 5 is a circuit diagram of a circuit that passes a transient current through the armature coil in the embodiment of the present invention.
Figure 6:
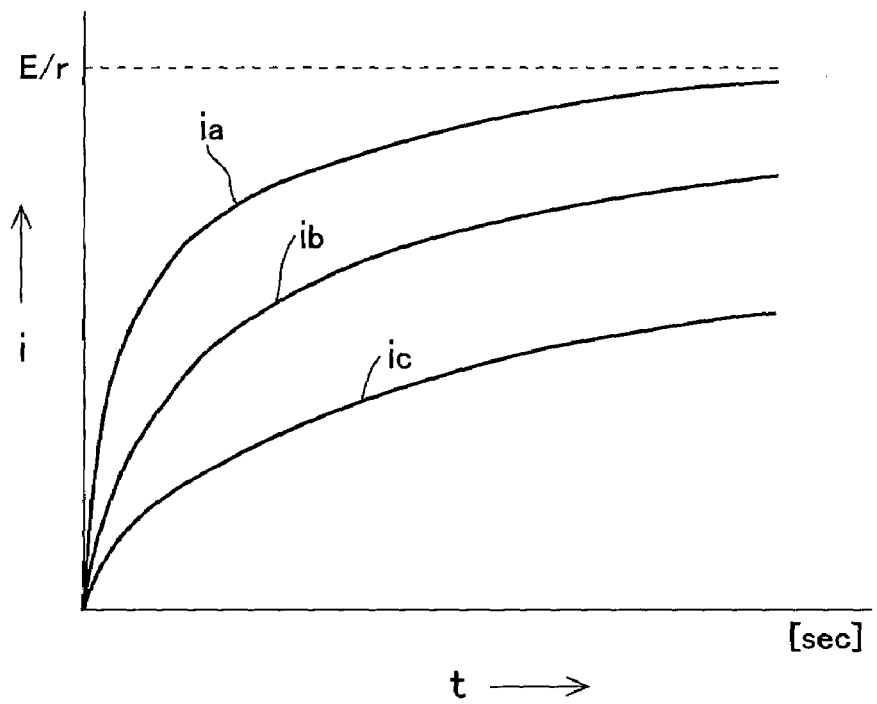
FIG. 6 is a graph showing transient currents passing when the armature coils have different inductances.

As shown in FIG. 5, a circuit is constructed for applying a voltage E of the battery 2 via a transistor TR1 to a series circuit of resistance r and an inductance L, and the transistor TR1 is turned on. Then, a transient current i expressed by the following formula (1) passes.

$$i = (E/r)[1 - \exp\{-(r/L)t\}] \quad (1)$$

where the resistance r is fixed, and the inductance L takes values of La, Lb and Lc (La<Lb<Lc), then a relationship r/La>r/Lb>r/Lc is satisfied. Thus, transient currents ia, ib and ic passing when the inductance values are La, Lb and Lc with respect to time t are as shown in FIG. 6.

Figure 7:
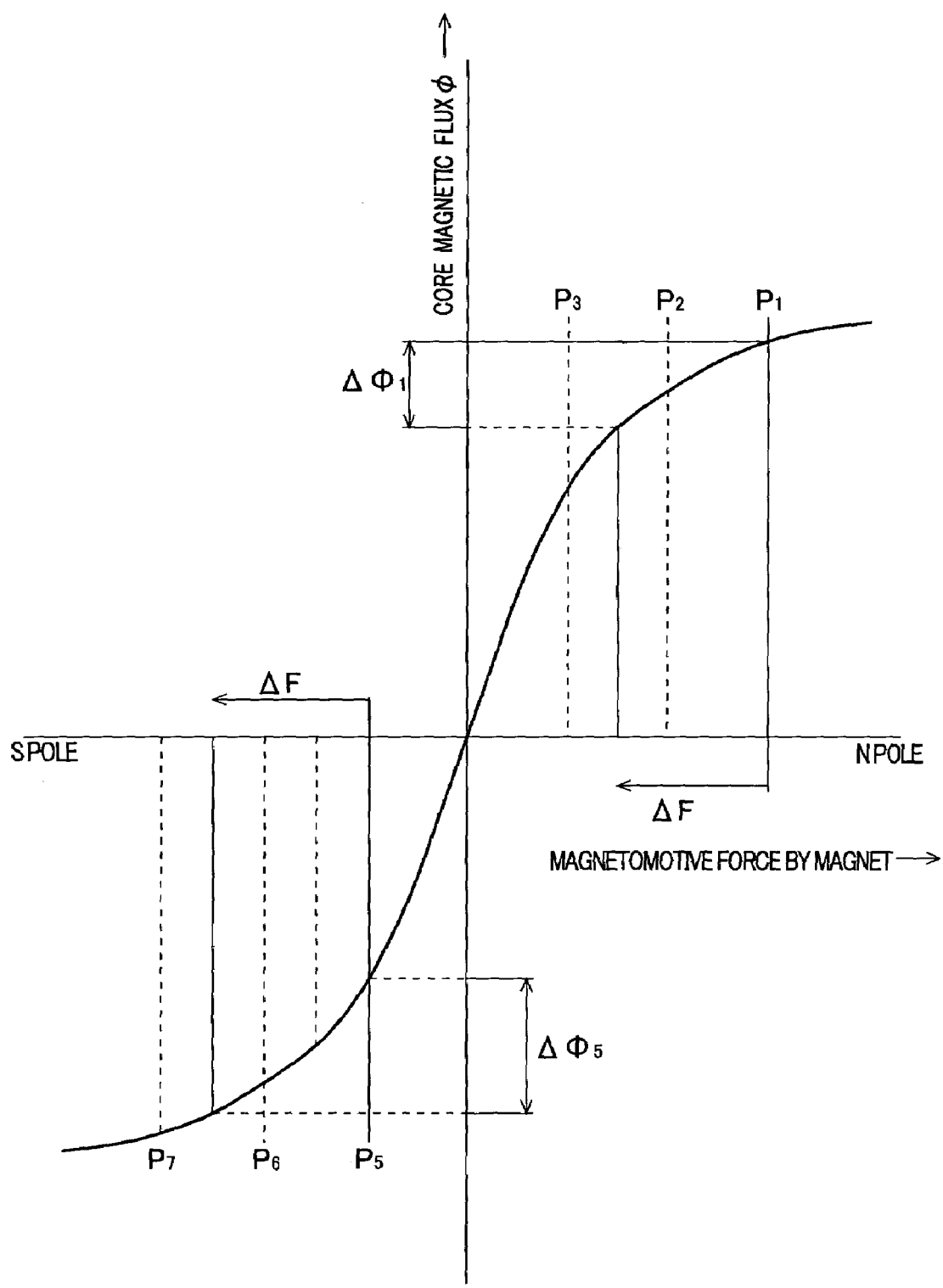
FIG. 7 is a graph showing that magnetic flux changes by a reverse magnetomotive force caused when the transient current is passed differ according to the difference in the position of the magnetic field of the rotor in a rotating electric machine of a magnetic field rotation type.

As in the example in FIG. 1, when the rotor is at the position P1 in FIG. 3A, the switch element Qu of the inverter circuit 3 is turned on, and the transient current energizing switch 6 is turned on. At this time, as shown in FIG. 7, a current $\Delta I$ passing through the armature coil Lu generates a magnetomotive force $\Delta F$, and the magnetic flux of the U-phase armature core changes by $\Delta \phi 1$, and thus a reverse induced voltage is generated in the coil. When an inductance of the U-phase armature coil when the rotor is at the position P1 is L1, and the number of windings of the U-phase armature coil is n, a relationship $L1 \times \Delta I = n\Delta\phi 1$ is satisfied. Thus, the inductance L1 of the U-phase armature coil when the rotor is at the position P1 is expressed by the following formula:

$$L1 = n\Delta\phi 1/\Delta I \qquad (2)$$

On the other hand, when the rotor is at the position P5 in FIG. 3E, the switch element Qu of the inverter circuit 3 is turned on, and the transient current energizing switch 6 is turned on. Then, a magnetic flux change $\Delta\phi 5$ is caused by the magnetomotive force AF generated by the passage of the current $\Delta I$. At this time, an inductance L5 of the U-phase armature coil is expressed by the following formula:

$$L5 = n\Delta\phi 5/\Delta I \qquad (3)$$

where $\Delta\phi 1 < \Delta\phi 5$, and thus L1<L5, and transient currents i1 and i5 passing when the rotor is at the positions P1 and P5 are as shown in FIG. 8.

When the rotor is at the position P1, the position of the rotor relative to the V-phase and W-phase armature coils correspond to the position P5 relative to the U-phase armature coil. Thus, with the rotor being at the position P1, when the switch element Qv of the inverter circuit 3 is turned on and the transient current energizing switch 6 is turned on, and the switch element Qw of the inverter circuit 3 is turned on and the transient current energizing switch 6 is turned on, the transient current corresponding to i5 passes.

As described above, a peak value and a waveform of the transient current passing when the DC voltage is temporarily applied to the armature coil of each phase differ according to the position of the rotor 1A, and thus the process for temporarily applying the DC voltage to the armature coil of each phase of the stator to pass the transient current through the armature coil of each phase is performed for each of the three-phase armature coils, and peak values of the transient currents passed through the three-phase armature coils are measured and compared, or the peak values are compared and features of waveforms of the transient currents passed through the three-phase armature coils are compared to allow determination of the position of the magnetic field of the rotor relative to the three-phase armature coils.

In the present invention, whether the position of the rotor is determined from the peak values of the transient currents or both the peak values and the waveforms of the transient currents is decided according to whether the position of the rotor required for deciding a switching position of the switch pattern can be obtained. Specifically, when the positional information of the rotor required for deciding the switching position of the switch pattern can be obtained simply by comparing the peak values of the transient currents passed through the three-phase armature coils, the peak values only of the transient currents are used to determine the position of the rotor. When the positional information of the rotor required for deciding the switching position of the switch pattern cannot be obtained simply by comparing the peak values of the transient currents passed through the three-phase armature coils, both the peak values and the waveforms (the features extracted from the waveforms) of the transient currents are used to determine the position of the rotor.

When the position of the rotor is determined using the waveforms of the transient currents as one condition, the features of the waveforms of the transient currents passed through the m-phase armature coils are extracted and compared. The extraction of the features of the waveforms of the transient currents can be performed, for example, by the following methods.

Figure 9A:
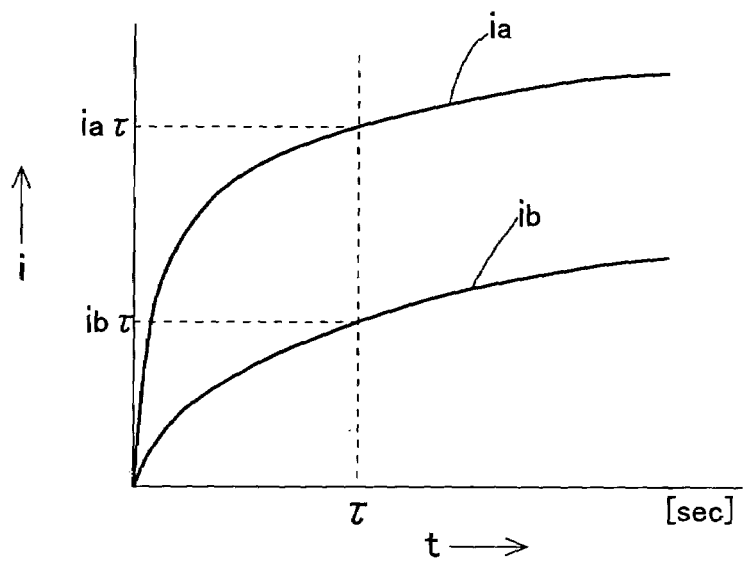
FIGS. 9A to 9C are graphs illustrating different methods for identifying the difference in the transient currents.

(a) As shown in FIG. 9A, current values $ia\tau$ and $ib\tau$ after a lapse of a fixed time $\tau$ from the application of the DC voltage to the armature coils are measured and compared.

Figure 9B:
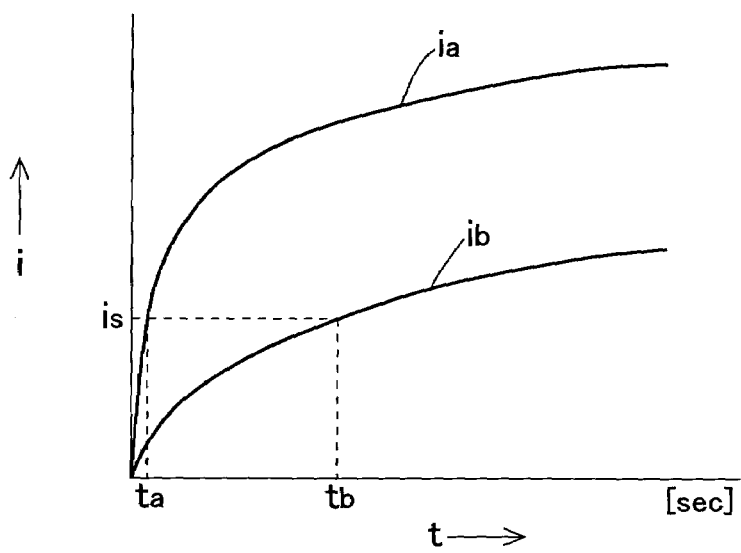

(b) As shown in FIG. 9B, after the transient currents ia and ib start to pass, times ta and tb required for the transient currents to reach a fixed current value is are measured and compared.

Figure 9C:
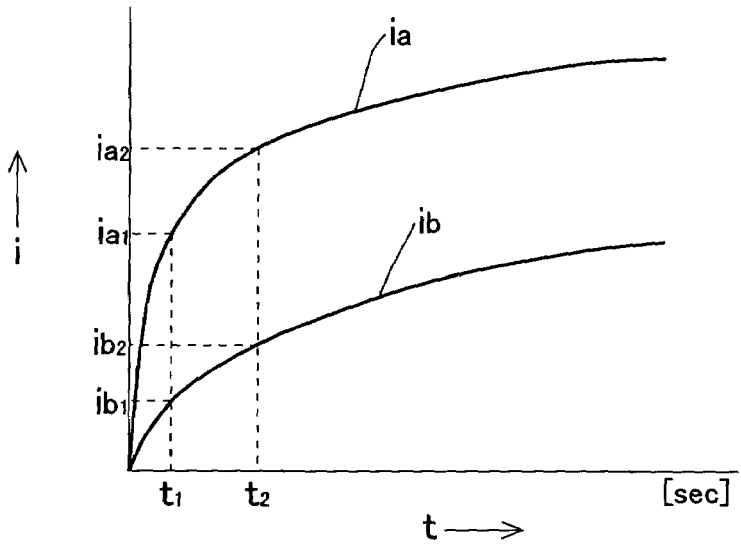

(c) As shown in FIG. 9C, a waveform is determined from a rate of change with time at a leading edge of the transient current i. For example, ib1/t1 and ia1/t1 are compared or ib2/t2 and ia2/t2 are compared.

As described above, during stop of the rotating electric machine, a process for successively turning on the switch elements Qu, Qv and Qw of the upper side of the bridge of the inverter circuit connected to the three-phase armature coils Lu, Lv and Lw is performed with the switch 6 being closed, and thus the transient currents are passed through the armature coils Lu, Lv and Lw, the peak values of the transient currents passed through the three-phase armature coils Lu to Lw are compared or the peak values and the waveforms of the transient currents are compared to allow determination of the position of the rotor 1A.

If the positional relationship of the rotor 1A relative to the armature coil of each phase can be determined during the stop of the rotating electric machine, a combination of the switch elements of the inverter circuit that need to be turned on in order to rotate the rotor 1A in a predetermined direction based on the determination results can be determined as the switch pattern. Thus, the inverter circuit is controlled so as to turn on the switch elements of the inverter circuit according to the decided switch pattern to allow rotation of the rotor in the predetermined direction.

If the rotating electric machine can be rotated, then, an excitation phase is decided by the second switch pattern deciding means 25 based on the positional information of the rotor obtained from the pulse signal output by the signal generating rotor 5, and the control of the inverter circuit 3 is switched by the control switching means 27 from the control by the first inverter control means to the second inverter control means 26, and the inverter circuit 3 is controlled so as to turn on the switch elements of the inverter circuit 3 with the switch pattern decided by the second switch pattern deciding means 25 to operate the rotating electric machine as a brushless motor.

A switch pattern, together with the waveforms of the output pulse signals of the signal generating device 5, is shown in FIG. 10A, which is decided based on the output pulse signals of the signal generating device 5 in the case where excitation control is switched to the control by the second inverter control means 26 and the inverter circuit 3 is controlled so as to pass the excitation current through the armature coils Lu to Lw by 180° switching when the rotating electric machine is started and the rotor 1A reaches the position P1 in FIG. 3A. FIG. 10A shows the waveforms of the pulse signals output by the signal generating rotor 5, and Vf11 and Vr11 show pulse signals generated by the pulser 5B detecting a leading edge f11 and a trailing edge r11 of the reluctor 11 in the rotational direction when the rotor is at the positions P1 and P3, and Vf12 and Vr12 show pulse signals generated by the pulser 5B detecting a leading edge f12 and a trailing edge r12 of the reluctor 12 in the rotational direction when the rotor is at the positions P5 and P7. Vf13 and Vr13 show pulse signals generated by the pulser 5B detecting a leading edge f13 and a trailing edge r13 of the reluctor 13 in the rotational direction when the rotor is at the positions P9 and P11.

The table in FIG. 10B shows switch patterns of the inverter circuit, and in FIG. 10B, the switch elements Qu, Qv and Qw are turned on in sections indicated by reference characters U, V and W, and the switch elements Qx, Qy and Qz are turned on in sections indicated by reference characters X, Y and Z. For example, when the rotor reaches the position P5 and the pulse signal Vf12 is generated in a state where the switch elements Qu, Qy and Qz are turned on and the excitation current passed through the armature coil Lu is passed out through the armature coils Lv and Lw, the combination (switch pattern) of the switch elements to be turned on is switched from (Qu, Qy, Qz) to (Qu, Qv, Qz) to switch from the state where the excitation current passed through the armature coil Lu is passed out through the armature coils Lv and Lw to a state where the excitation current passed through the armature coils Lu and Lv is passed out through the armature coil Lw.

When the rotor reaches the position P7, the combination of the switch elements to be turned on is switched from (Qu, Qv, Qz) to (Qx, Qv, Qz) to switch from the state where the excitation current passed through the armature coils Lu and Lv is passed out through the armature coil Lw to a state where the excitation current passed through the armature coil Lv is passed out through the armature coils Lu and Lw.

In the embodiment, the reluctor and the pulser are provided so as to generate the pulse signal at the position where the switch pattern is switched, and thus if the position of the rotor when the control is switched (the position P1 in the example in FIG. 10) is decided, the excitation phase can be easily decided.

When the rotor can be only slightly rotated because of a heavy load at the start of the rotating electric machine, the rotating electric machine is driven for a certain time with an initial switch pattern, and if the pulser generates no pulse signal during the driving, the driving is temporarily stopped to again determine the position of the rotor, decide a new switch pattern based on the determination results, and control the inverter circuit so as to turn on the switch elements of the inverter circuit with the decided switch pattern. This control is continued while the rotation speed is too low to generate a pulse signal that can be identified by the pulser 5B, thereby allowing continuous rotation of the rotating electric machine.

When the rotating electric machine is operated as a motor for starting the internal combustion engine, it is considered that the rotational speed cannot be sufficiently increased in a compression stoke of the engine, and the pulse signal that can be identified by the pulser cannot be generated. If the above described control is continued in such a case, the rotational speed increases when the compression stroke of a combustion cycle of the engine is finished and an expansion stroke is started, and thus the pulse signal that can be identified by the pulser can be generated to switch to the control by the second inverter control means, and sufficient torque is generated in a next compression stroke to perform a function as a starter motor.

As described above, according to the control device of the embodiment, when the rotating electric machine is stopped and the signal generating device cannot generate the pulse signal, the inverter circuit is controlled by the switch pattern decided based on the position of the rotor determined from the transient current passed through the armature coil to start the rotating electric machine. This allows the initial switch pattern in the process for starting the rotating electric machine to be decided to start the rotating electric machine without using a sensor having low heat resistance such as a Hall element or an expensive sensor such as a resolver. After the rotating electric machine is started, and then the rotational speed increases to generate a pulse signal having a level that can be identified by the signal generating device, the switch pattern can be decide to excite the armature coil based on the position of the rotor determined using the rotational angle information obtained from the pulse signal output by the signal generating device 5, thereby allowing rotation of the rotating electric machine as a general brushless motor.

Next, the method for actually deciding the initial switch pattern will be described. FIG. 11 shows changes $\Delta\phi1$ and $\Delta\phi2$ in the magnetic flux $\phi$ passing through the U-phase core when the rotor is at the positions P1, P2, P3, . . . (P8 and greater are omitted) and the switch 6 in FIG. 1 is turned on to pass the transient current. Changes in the magnetic flux passing through the U-phase to W-phase cores when the rotor is at the positions P1 to P12 and the switch 6 is turned on to pass the transient currents through the U-phase to W-phase armature coils are collectively shown in the table in FIG. 12. The changes in the magnetic flux passing through the U-phase to W-phase cores are shown in curves in FIG. 13A, and peak values $\Delta iu$, $\Delta iv$ and $\Delta iw$ of the detected transient currents are as shown in FIG. 13B. A combination of switch elements of the inverter circuit that are to be first turned on is decided as an initial switch pattern from the transient currents in FIG. 13B, and a drive signal is provided to the switch elements of the inverter circuit 3 so as to turn on the switch elements of the inverter circuit with the decided switch pattern, thereby allowing rotation of the rotor.

Here, FIG. 13C shows initial switch patterns when the rotor is at the positions P1 to P13 as control for the inverter circuit by 180° switching control. In the switch pattern in FIG. 13C, reference characters U, V, W, X, Y and Z show that the switch elements Qu, Qv, Qw, Qx, Qy and Qz are turned on. For example, the switch pattern (U, Y, W) means that the switch elements Qu, Qy and Qw are turned on.

In some positions of the rotor, the switch pattern is uniquely decided according to the order of levels of the peak values $\Delta iu$, $\Delta iv$ and $\Delta iw$ of the transient currents shown in FIG. 13B, but in other positions, the switch pattern cannot be decided only according to the order of the levels of the transient currents. For example, the order of the levels of the peak values $\Delta iu$, $\Delta iv$ and $\Delta iw$ of the transient currents at the positions P1, P5 and P9 is the same as the order of levels of the peak values $\Delta iu$, $\Delta iv$ and $\Delta iw$ of the transient currents at the positions P7, P11 and P3. Thus, the initial switch pattern of the inverter circuit cannot be decided only by checking the order of the levels of the peak values of the transient currents.

Figure 14A:
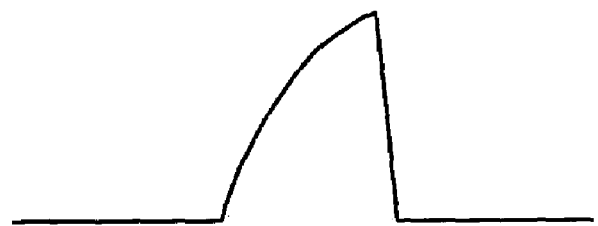
FIGS. 14A to 14C are waveform illustrations of the transient currents passing through the U-phase to W-phase armature coils in a transient current energizing process when the rotor is at the position P1 in FIG. 3.
Figure 14B:
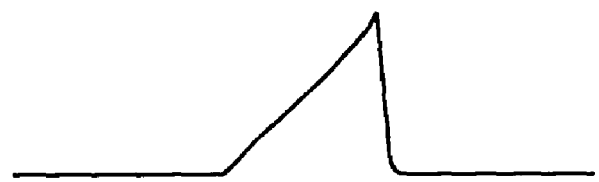
Figure 14C:
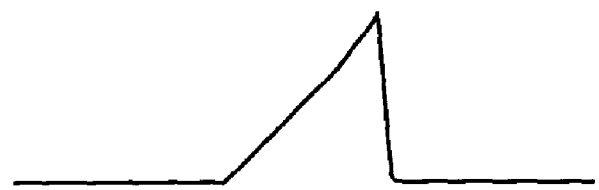

For the waveforms of the transient currents $\Delta iu$ to $\Delta iw$, for example, the waveforms of the transient currents $\Delta iu$ to $\Delta iw$ at the position P1 are as shown in FIGS. 14A to 14C, while the waveforms of the transient current Δiu to Δiw at the position P7 are as shown in FIGS. 15A to 15C, and the waveform of the U-phase transient current Δiu at the position P1 is different from that at the position P7. At the position P1, the transient current passes in a direction of demagnetizing the saturated U-phase core to cause a magnetic flux change Δφ1, and thus the waveform of the transient current is convex (a waveform with a curved leading edge like a quadratic curve) rather than triangular, and the transient current passing through the U-phase armature coil becomes the maximum. Thus, when the maximum transient current is the U-phase transient current, it is determined whether the waveform is convex rather triangular. Then, when it is determined that the waveform is convex, it can be determined that the rotor is at the position P1.

Figure 16A:
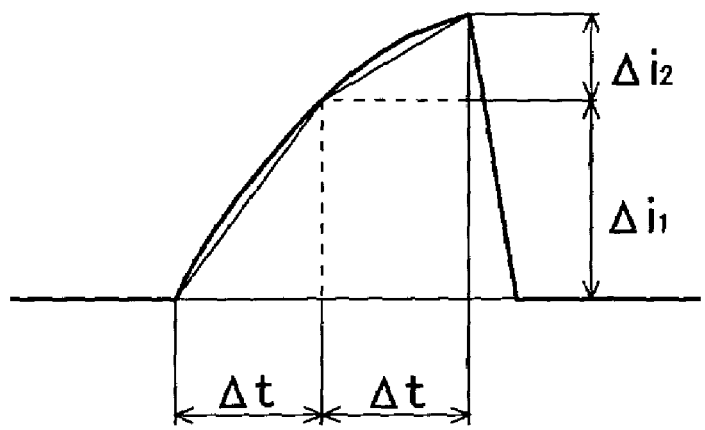
FIGS. 16A and 16B illustrate a method for identifying whether the waveform of the transient current is convex or triangular.
Figure 16B:
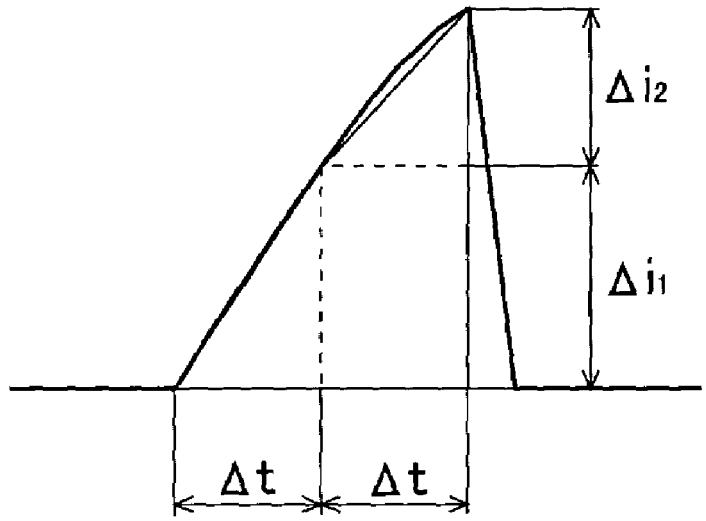

When the waveform of the transient current is convex, as shown in FIG. 16A, a rate of increase in current in the second half of the waveform Δi2/Δ is relatively smaller than a rate of increase in current in the first half of the waveform Δi1/Δt. On the other hand, when the waveform of the transient current is triangular, as shown in FIG. 16B, a difference between the rate of increase in current in the first half of the waveform Δi1/Δt and the rate of increase in current in the second half of the waveform Δi2/Δ becomes smaller. Thus, with a time width of the transient current being 2Δt, a rate of change with time in the first half of the transient current waveform Δi1/Δt and a rate of change with time in the second half thereof. Δi2/Δt are calculated to determine whether the difference between the rate of change in the first half Δi1/Δt and the rate of change in the second half Δi2/Δt is a set value or more. Thus, it can be determined whether the waveform of the transient current is convex or triangular, and from the determination results, it can be determined whether the rotor is at the position P1 or P7.

FIG. 17 shows an example of an algorithm of a program executed by the microprocessor for constructing the first switch pattern determination means 22 that decides the initial switch pattern of the inverter circuit when the rotating electric machine is operated as the brushless motor from the order of the levels of the peak values of the transient currents and the waveform of the maximum transient current obtained by performing the transient current energizing process.

According to the algorithm in FIG. 17, first, in Step 1, a maximum Δimax among Δiu, Δiv and Δiw is found when the process for determining the initial switch pattern is started. When it is determined as in Step 2 that Δimax is Δiu, then Δiv and Δiw are compared. When it is determined as in Step 3 that Δiv is larger than Δiw as, the process moves to Step 4 to determine whether the waveform of Δiu is convex. When it is determined that the waveform of Δiu is not convex, the initial switch pattern is decided as UVZ in Step 5, and when it is determined that the waveform of Δiu is convex, the initial switch pattern is decided as XYW in Step 6.

Δiv and Δiw are compared in Step 3, and when it is determined as in Step 7 that Δiv is smaller than Δiw, the process goes to Step 8 to determine whether the waveform of Δiu is convex. When it is determined that the waveform of Δiu is not convex, the initial switch pattern is decided as XVZ in Step 9, and when it is determined that the waveform of Δiu is convex, the initial switch pattern is decided as UYW in Step 10.

As in Step 11, when it is determined that the peak value of the maximum transient current found in Step 1 is Δiv, then Δiw and Δiu are compared. When Δiw is larger than Δiu as in Step 12, the process moves to Step 13 to determine whether the waveform of Δiv is convex. When it is determined that the waveform of Δiv is not convex, the initial switch pattern is decided as XVW in Step 14, and when it is determined that the waveform of Δiv is convex, the initial switch pattern is decided as UYZ in Step 15.

Δiw and Δiu are compared, and when it is determined as in Step 16 that Δiw is smaller than Δiu, the process goes to Step 17 to determine whether the waveform of Δiv is convex. When it is determined that the waveform of Δiv is not convex, the initial switch pattern is decided as XYW in Step 18, and when it is determined that the waveform of Δiv is convex, the initial switch pattern is decided as UVZ in Step 19.

As in Step 20, when it is determined that the peak value of the maximum transient current found in Step 1 is Δiw, then Δiu and Δiv are compared. When Δiu is larger than Δiv as in Step 21, the process moves to Step 22 to determine whether the waveform of Δiw is convex. When it is determined that the waveform of Δiw is not convex, the initial switch pattern is decided as UYW in Step 23, and when it is determined that the waveform of Δiw is convex, the initial switch pattern is decided as XVZ in Step 24.

Δiu and Δiv are compared, and when it is determined as in Step 25 that Δiu is smaller than Δiv, the process goes to Step 26 to determine whether the waveform of Δiw is convex. When it is determined that the waveform of Δiw is not convex, the initial switch pattern is decided as UYZ in Step 27, and when it is determined that the waveform of Δiw is convex, the initial switch pattern is decided as XVW in Step 28.

Figure 18:
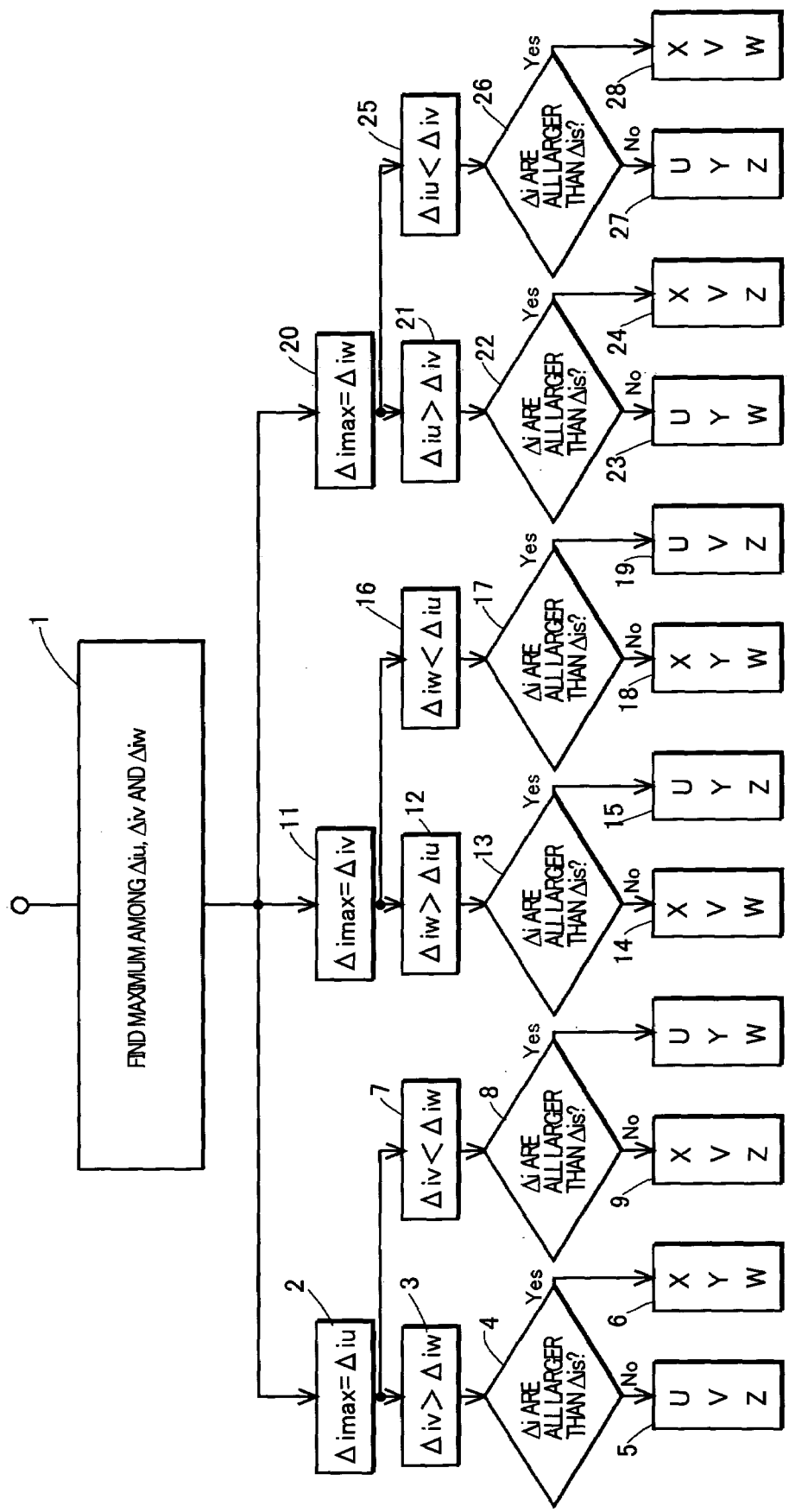
FIG. 18 is a flowchart of another example of an algorithm of a program executed by the microprocessor for constructing the first switch pattern deciding means of the control device in FIG. 2.

Instead of checking whether the waveform of the transient current is convex as described above, as shown in FIG. 13, the position can be determined using the peak values Δiu, Δiv and Δiw of the transient currents passing through the armature coils of all phases being larger than a certain determination value Δis at the particular positions P1, P5 and P9. FIG. 18 shows a flowchart of an algorithm of a program executed by the microprocessor for constructing the first switch pattern deciding means 22 when the position is determined by using a relationship such that the peak values of the transient currents passing through the armature coils of all phases are larger than the determination value Δis at the particular positions and not at other positions. The flowchart in FIG. 18 is similar to the flowchart in FIG. 16 except that it is determined whether the peak values Δiu, Δiv and Δiw of the transient currents of all phases are larger than the determination value Δis in Steps 4, 8, 13, 17, 22 and 26, and thus detailed descriptions thereof will be omitted.

The control switching means 27 switches control so that the inverter circuit 3 is controlled by the first inverter control means 23 at the start of the rotating electric machine 1, and after the signal generating device enters the state of generating the pulse signal having the level equal to or higher than the threshold, the inverter circuit is controlled by the second inverter control means 26. Thus, after the rotating electric machine is started, the switch pattern is switched by the pulse generated by the signal generating device 5 to operate the rotating electric machine as the brushless motor.

Figure 20:
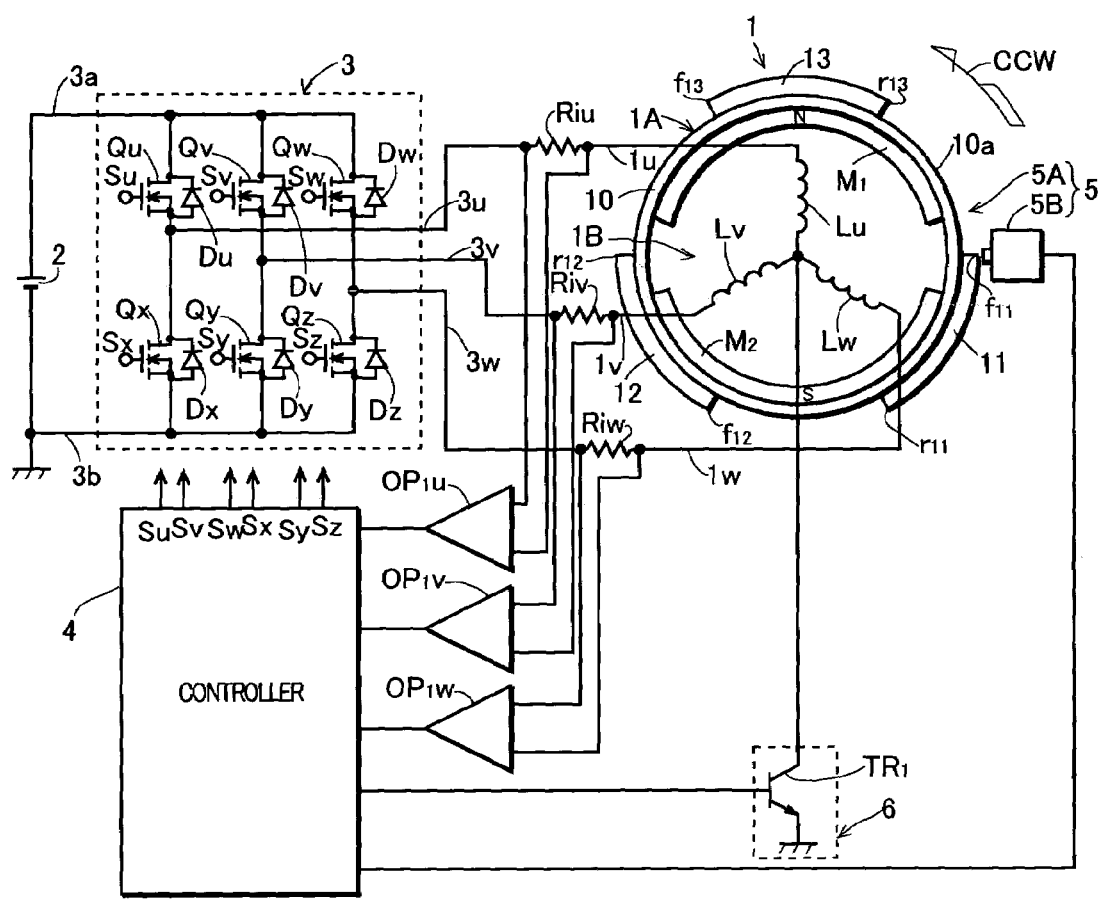
FIG. 20 is a circuit diagram of a construction of hardware according to another embodiment of the present invention.

In the example in FIG. 1, the current detection means 7 is inserted between the transient current energizing switch 6 and the neutral point of the armature coils. As shown in FIG. 20, however, the transient current energizing switch 6 may be connected between the neutral point of the armature coils Lu to Lw and the ground, shunt resistors Riu, Riv and Riw that constitute current detection means may be inserted between the non-neutral point side terminals 1u, 1v and 1w of the three-phase armature coils and the AC terminals $3u$, $3v$ and $3v$ of the inverter circuit 3, and current detection signals obtained across the resistors may be input to the controller 4 via a detection circuit using arithmetical operation amplifiers OP1$u$, OP1$v$ and OP1$w$.

The means for detecting the transient current is not limited to the shunt resistor, but a current transformer or a Hall element may be used as current detection means.

In the above described embodiment, the switching control of the inverter circuit is performed by the 180° switching control, but the present invention may be of course applied to the case where the inverter circuit is controlled by 120° switching control.

Figure 19:
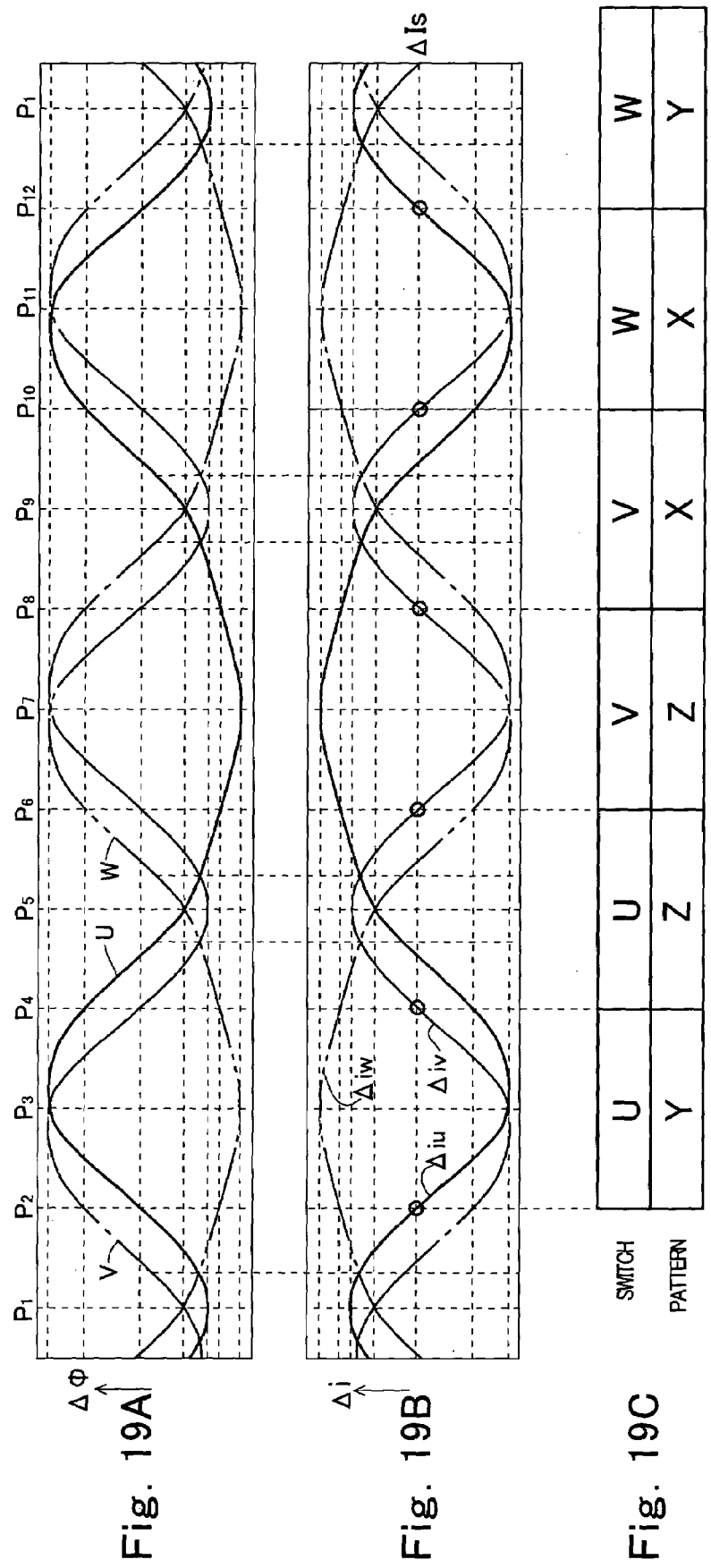
FIG. 19A is a graph showing changes in the magnetic fluxes passing through the U-phase to W-phase cores by the transient currents.
FIG. 19B is a graph showing peak values Δiu, Δiv and Δiw of the detected transient currents.
FIG. 19C is a table showing an initial switch pattern when the rotor is at the positions P1 to P13 in FIG. 3 as an inverter circuit is controlled by 120° switching control.

FIG. 19 shows magnetic fluxes $\Delta\phi$ passing through the U-phase to W-phase cores when the rotor is at the positions P1 to P12 and the transient currents are passed through the U-phase to W-phase armature coils, peak values $\Delta iu$, $\Delta iv$ and $\Delta iw$ of the detected transient currents, and changes in a switch pattern when the inverter circuit 3 is controlled by the 120° switching control.

In the case where the inverter circuit is controlled by the 120° switching control, an initial switch pattern is switched according to whether a peak value of a transient current presenting an intermediate value among the peak values $\Delta iu$, $\Delta iv$ and $\Delta iw$ of the transient currents passed through the three-phase armature coils in a transient current energizing process is a determination value Is or more or less at a position where the peak value of the transient current presenting the intermediate value passes the determination value $\Delta$Is. For example, the switch pattern is switched to (U, Y) at a position P2 where $\Delta iu$ presenting the intermediate value among the peak values $\Delta iu$, $\Delta iv$ and $\Delta iw$ is the determination value $\Delta$Is or less, and the switch pattern is switched to (U, Z) at a position P4 where $\Delta iv$ presenting the intermediate value among the peak values $\Delta iu$, $\Delta iv$ and $\Delta iw$ is the determination value $\Delta$Is or more. The switch pattern is switched to (V, Z) at a position P6 where $\Delta iv$ presenting the intermediate value among the peak values $\Delta iu$, $\Delta iv$ and $\Delta iw$ is the determination value $\Delta$Is or less.

In the embodiment, the rotating electric machine includes the three-phase armature coils, but the present invention may be applied to a rotating electric machine including polyphase armature coils with more phases.

In the above description, the magnetic field of the rotor has two poles, but the magnetic field of the rotor may have even number of poles. In the embodiment, the magnetic field of the rotor is produced by mounting a permanent magnet to a rotor yoke, but the present invention may be applied to the case where the magnetic field of the rotor is produced by passing an excitation current through an excitation coil wound around the rotor core.

In the above description, the star-connected annular cores having the three poles are used as the armature cores of the stator with the three-phase armature coils being wound around the three salient poles of the cores, but the present invention may be applied to the case where the three-phase (generally m-phase) armature coils are wound around a slot of the armature core in a distributed manner.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A rotor position determination device of a rotating electric machine for determining a position of a rotor of the rotating electric machine relative to m-phase (m is an integer equal to or more than 2) armature coils, said rotating electric machine including a stator having the m-phase armature coils, and the rotor having a magnetic field, comprising:
    transient current energizing means for performing, for each of said m-phase armature coils, a transient current energizing process for temporarily applying a DC voltage to the armature coil of each phase of said stator to pass a transient current through the armature coil of each phase; and
    rotor position determination means for detecting the transient current passed through each of said m-phase armature coils in said transient current energizing process and determining the position of said rotor relative to said m-phase armature coils from the detected transient currents.

2. A rotor position determination device of a rotating electric machine for determining a position of a rotor of the rotating electric machine relative to m-phase (m is an integer equal to or more than 2) armature coils, said rotating electric machine including a stator having the m-phase armature coils star-connected so as to have a neutral point, and the rotor having a magnetic field, comprising:
    transient current energizing means for performing, for each of said m-phase armature coils, a process for temporarily applying a DC voltage between a non-neutral point side terminal of the armature coil of each phase of said stator and a grounded potential portion to pass a transient current through the armature coil of each phase; and
    rotor position determination means for detecting the transient current passed through each of said m-phase armature coils by said transient current energizing means and determining the position of said rotor relative to said m-phase armature coils from the detected transient currents.

3. The rotor position determination device of a rotating electric machine according to claim 1, wherein said rotor position determination means is comprised so as to determine the position of said rotor relative to said m-phase armature coils from peak values of said transient currents.

4. The rotor position determination device of a rotating electric machine according to claim 2, wherein said rotor position determination means is comprised so as to determine the position of said rotor relative to said m-phase armature coils from peak values of said transient currents.

5. The rotor position determination device of a rotating electric machine according to claim 1, wherein said rotor position determination means is comprised so as to determine the position of said rotor relative to said m-phase armature coils from peak values and waveforms of said transient currents.

6. The rotor position determination device of a rotating electric machine according to claim 2, wherein said rotor position determination means is comprised so as to determine the position of said rotor relative to said m-phase armature coils from peak values and waveforms of said transient currents.

7. A control device of a rotating electric machine for controlling supply of a drive current to m-phase (m is an integer equal to or more than 2) armature coils to operate as a motor said rotating electric machine including a stator having the m-phase armature coils star-connected so as to have a neutral point, and a rotor having a magnetic field, comprising:

a signal generating device that detects an edge of a reluctor to generate a pulse signal when a rotational angle position of said rotor matches a predetermined position;

a bridge-type inverter circuit having a DC terminal to which an output of DC power is applied and m number of AC terminals to which m number of non-neutral point side terminals of said m-phase armature coils are connected;

a transient current energizing switch provided between a neutral point of said m-phase armature coils and a grounded potential portion;

current detection means for detecting a current passing through said transient current energizing switch; and a controller for controlling said inverter circuit and said transient current energizing switch, wherein said controller comprises:

transient current energizing means for controlling switch elements of said inverter circuit and said transient current energizing switch so as to perform, for each of said m-phase armature coils, a process for temporarily applying a DC voltage between a non-neutral point side terminal of the armature coil of each phase of said stator and the grounded potential portion to pass a transient current through the armature coil of each phase;

first rotor position determination means for detecting the transient current passed through each of said m-phase armature coils by said transient current energizing means and determining the position of said rotor relative to said m-phase armature coils from the detected transient currents;

first switch pattern deciding means for deciding as a switch pattern a combination of switch elements of said inverter circuit that need to be turned on in order to rotate said rotor in a predetermined direction based on the position of said rotor determined by said first rotor position determination means;

first inverter control means for controlling said inverter circuit so as to turn on the switch elements of said inverter circuit according to the switch pattern decided by said first switch pattern deciding means;

second rotor position determination means for determining the position of said rotor relative to the m-phase armature coils of said stator based on rotational angle information of said rotor obtained from a pulse signal generated by said signal generating device;

second switch pattern deciding means for deciding as a switch pattern a combination of switch elements of said inverter circuit that need to be turned on in order to rotate said rotor in a predetermined direction based on the position determined by said second rotor position determination means;

second inverter control means for controlling said inverter circuit so as to turn on the switch elements of said inverter circuit according to the switch pattern decided by said second switch pattern deciding means; and control switching means for switching control so that said inverter circuit is controlled by said first inverter control means at the start of said rotating electric machine, and after said signal generating device enters a state of generating a pulse signal having a level equal to or higher than a threshold, said inverter circuit is controlled by said second inverter control means.

8. The control device of a rotating electric machine according to claim 7, wherein said signal generating device is comprised so as to generate the pulse signal at a position where said switch pattern is switched.

* * * * *